US012721320B2

(12) United States Patent
Schroeder et al.

(10) Patent No.: US 12,721,320 B2
(45) Date of Patent: Sep. 1, 2026

(54) SYSTEMS, METHODS, AND APPARATUSES FOR COMPUTERIZED ANIMAL MANAGEMENT

(71) Applicant: HERDX, INC., Boerne, TX (US)

(72) Inventors: David Schroeder, Boerne, TX (US); Andrew Silva, Boerne, TX (US)

(*) Notice: Subject to any disclaimer, the term of this patent is extended or adjusted under 35 U.S.C. 154(b) by 46 days.

(21) Appl. No.: 18/225,538

(22) Filed: Jul. 24, 2023

(65) Prior Publication Data

US 2024/0023521 A1 Jan. 25, 2024

Related U.S. Application Data

(60) Provisional application No. 63/391,625, filed on Jul. 22, 2022.

(51) Int. Cl.
*A01K 29/00* (2006.01)
*A01K 11/00* (2006.01)
*G06K 7/10* (2006.01)

(52) U.S. Cl.
CPC .......... *A01K 29/005* (2013.01); *A01K 11/006* (2013.01); *G06K 7/10712* (2013.01)

(58) Field of Classification Search
None
See application file for complete search history.

(56) References Cited

U.S. PATENT DOCUMENTS

2006/0022800 A1 2/2006 Krishna et al.
2007/0200712 A1* 8/2007 Arneson ............ G06K 7/10316 340/572.7
2009/0002170 A1* 1/2009 Ishikawa .............. G06K 7/0008 340/572.1
2009/0289116 A1 11/2009 Copeland et al.
2013/0120118 A1 5/2013 Moshfeghi
2014/0306804 A1* 10/2014 Stiefel .................... G06Q 10/08 340/10.1
2019/0069512 A1* 3/2019 Eriksson ............ G06K 7/10128
2021/0176969 A1 6/2021 Brayer et al.
2021/0211152 A1* 7/2021 Kenney ................ H04B 1/3838

OTHER PUBLICATIONS

Written Opinion of the International Searching Authority regarding International application No. PCT/Us2023/028498 Dec. 19, 2023.
International Search Report regarding International application No. PCT/US2023/028498 Dec. 19, 2023.

* cited by examiner

*Primary Examiner* — John F Mortell
(74) *Attorney, Agent, or Firm* — Jackson Walker LLP; William R. Borchers

(57) ABSTRACT

Animals may be managed by a variety of systems, processes, and techniques. In particular implementations, an animal management system may include a first radio frequency (RF) reader system adapted to scan for radio frequency identification tags (RFID) tags in a first area and a second radio frequency (RF) reader system adapted to scan for RFID tags in a second area that overlaps with the first area and send information regarding detected RFID tags in the second area to the first RF reader system. The first RF reader system may compare the RFID tags detected by the second RF reader system to those detected by the first RF reader system and dedupe detections of the same RFID tags.

69 Claims, 20 Drawing Sheets

SYSTEMS, METHODS, AND APPARATUSES FOR COMPUTERIZED ANIMAL MANAGEMENT

RELATED APPLICATIONS

This application claims priority to U.S. Patent Application No. 63/391,625, entitled "Systems, Methods, and Apparatuses for Animal Management" and filed on Jul. 22, 2022. This prior application is herein incorporated by reference in its entirety.

TECHNICAL FIELD

This invention relates in general to management of animals and, more particularly, to comprehensive systems and methods for monitoring animals and assessing animal health.

BACKGROUND

Feeding facilities (e.g., feedlots or feed yards) are critical to the world's food supply. But managing them efficiently presents many challenges. For example, upon arrival at a typical cattle feedlot, each member of the herd will make at least one trip through a chute, where handlers often can afford to spend only about 45 seconds processing each animal. Initial processing typically involves some variation of each of the following: (1) standard treatment such as spraying, deworming, and antibiotics; (2) when feasible, some level of assessment and any special treatment that may be indicated based on the assessment; and (3) identification by attaching either an RFID ear tag, a numbered or barcoded ear tag, or some other form of individual animal identification. Other processing activities can include vaccination, castration, horn-tipping, weighing, etc., all of which can help in managing the herd. Naturally, with whatever processing takes place, records also need to be created, updated, and transferred for each cow (e.g., calf, heifer, steer, bull, etc.) being processed.

Challenges arise from the need for speed versus trying to determine what particular type of treatment is needed for each individual cow, which can be quite difficult. When a feedlot omits a critical treatment, it can quickly lose a large part of the herd.

In the United States' cattle industry, annual mortality of cattle due to disease is estimated to be in the hundreds of millions of dollars. A reliable method of determining the health of a cow or the presence of disease is by assessing the body temperature of the animal. In the case of infections, environmental factors, or toxins, a cow's temperature will elevate. These elevations are diagnostic to veterinarians in the diagnosis of disease and disease conditions in cattle. In the day-to-day production of cattle, the evaluation of the presence of increased body temperature or fever is underutilized due to time constraints and the need to physically restrain the animal. This underutilization of temperature evaluation delays the diagnosis of disease and therefore increases the ineffective uses of medications and loss of animals.

So, rather than attempt to predict which cows need treatments and which do not, the feedlot industry is constantly facing temptations to mass treat all animals entering a feedlot as a precaution. But mass antibiotic treatment of an entire herd of potentially at risk cattle is not only expensive, it presents a litany of concerns for beef quality and microbial mutation. Thus, there has long been a huge need to improve herd processing through more accurate assessments and more intelligent treatments.

Other herd management practices have been advancing more systematically than animal assessment techniques, particularly in the area of animal tagging. Tags applied to each cow are used to identify the particular cow and are typically applied in the ear where they can be readily seen and tracked. Radio Frequency Identification ("RFID") technology is being utilized to a greater extent in the agricultural industry. Also, more and more historical data is being required by regulatory agencies before a calf can be slaughtered or packed.

At least three companies have attempted to help ranchers manage cattle based on temperature, but their attempts have been less than ideal. Tekvet [website: tekvet.com], Fever Tags LLC [website: fevertags.com], and Quantum Ag Products have launched systems of mobile temperature monitors (e.g., a surface-based thermistor mounted in the calves' ears and a temperature sensor in the calves' ear, respectively), which link to a base station.

SUMMARY

Animals may be managed by a variety of systems, processes, and techniques. In particular implementations, an animal management system may include a first radio frequency (RF) reader system adapted to scan for radio frequency identification tags (RFID) tags in a first area and a second radio frequency (RF) reader system adapted to scan for RFID tags in a second area that overlaps with the first area and sends information regarding detected RFID tags in the second area to the first RF reader system. The first RF reader system may compare the RFID tags detected by the second RF reader system to those detected by the first RF reader system and dedupe detections of the same RFID tags.

In certain implementations, the first RF reader system generates a first tag scan window upon detecting an RFID tag, scans for tags during the first tag scan window, and sends the list of RFID tags detected during the first tag scan window to the second RF reader system. The second RF reader system also generates a tag scan window upon detecting an RFID tag, scans for tags during the second tag scan window, and at the end of the second tag scan window, determines if the first tag scan window overlaps with the second tag scan window and dedupes any identical RFID tags between the first tag scan window and the second tag scan window. The second RF reader system can analyze the detection time of an RFID tag in each tag scan window to dedupe between tag scan windows.

In some implementations, the first RF reader system creates a tag scan period for each RFID tag detected tag during a tag scan window and updates the tag scan period upon subsequent detections of the RFID tag during the tag scan window.

In particular implementations, the second RF reader system is configured to communicate with an external network, the second RF reader system sending RFID tag data from the first RF reader system and the second RF reader system to the network. The first RF reader system may also be configured to communicate with an external network, and the first RF reader system can selectively choose to send its data to the external network as opposed to sending it to the second RF reader system. In certain situations, the first RF reader system may try to send the data through another RF reader system communicating with the second RF reader system before choosing to use the external network. The first RF reader system may also determine that it should not be communicating with the external network anymore, and the second RF reader system can receive RFID tag data from the first RF reader system and start sending RFID tag data from the first RF reader system to the external network.

The first RF reader system may include an antenna, a tag reader, a controller, and a housing, the housing enclosing the antenna, the tag reader, and the controller. The housing may include a slot for receiving the antenna and may encapsulate the antenna.

The first RF reader system may include an antenna that generates a fan beam. The fan beam may be at least twice as long as it is wide.

Certain implementations may include a camera configured to capture an image of the first area. The first RF reader system may be adapted to determine if an animal is present in the image and generate RFID scans if an animal is present in the first area.

The animal management system may also include a third RF reader system adapted to scan for RFID tags in a third area that does not overlap with the first two areas and send information regarding detected RFID tags to the first RF reader system. The third RF reader system may be adapted to determine that the RFID tag information has not been received by the first RF reader system and send the RFID tag information over the external network.

In some implementations, the RF reader systems may send status information to each other. Based on information regarding the second RF reader system, the first RF reader system can decide whether to cease its communication with the external network and instruct the second RF reader system to begin communicating with the external network. The first RF reader system may, for example, evaluate the battery status of the second RF reader system in determining whether to instruct it to begin communicating with the external network.

In some implementations, an animal management system may include a first radio frequency (RF) reader system adapted to scan for radio frequency tags in a first area and a second radio frequency system adapted to scan for RFID tags in a second area that does not overlap with the first area. The first RF reader system may generate a first tag scan window upon detecting an RFID tag and scan for tags during the first tag scan window, and the second RF reader system may generate a second tag scan window upon detecting an RFID tag and scan for tags during the second tag scan window. The second RF reader system can send information regarding RFID tags detected during the second tag scan window to the first RF reader system.

The first RF reader system may be adapted to transmit information regarding RFID tags detected during the first tag scan window and the second tag scan window to a remote host. Additionally, the second RF reader system may be configured to communicate with the remote host, and the second RF reader system may sends RFID tag data from the second RF reader system to the remote host. The second RF reader system may, for example, selectively choose to send its data to the remote host as opposed to sending it to the first RF reader system. The second RF reader system may try to send the information a through another RF reader system communicating with the first RF reader system before choosing to send it to the remote host. In certain implementations, the first RF reader system can determine that it should not be communicating with the remote host anymore, and the second RF reader system can receive RFID tag information from the first RF reader system and start sending RFID tag information from the first RF reader system to the remote host.

The first RF reader system may include an antenna, a tag reader, a controller, and a housing, the housing enclosing the antenna, the tag reader, and the controller. The antenna may, for example, generate a fan beam. The beam may, for instance be twice as long as it is wide. The RF reader system may also include a secondary antenna that is external to the housing. The secondary antenna may generate a beam that does or does not overlap with the antennas beam.

The animal management system may also include a camera configured to capture an image of the first area. The first RF reader system may determine if an animal is present in the image and scan for RFID tags if an animal is present in the first area.

In certain implementations, the RF reader systems may send status information to each other. The first RF reader system can decide whether to cease communicating with the remote host based on the status of the second RF reader system and instruct the second RF reader system to begin communicating with the remote host. The first RF reader system may, for example, evaluate the battery status of the second RF reader system in determining whether to instruct it to begin communicating with the remote host.

Various systems, processes, and techniques described herein may have one or more features. For example, the RF reader systems may provide a detection mesh to extend the area over which animals may be detected and tracked, which may increase the accuracy with which animals are monitored. Tracking animals may be used to improve animals health by, for example, identifying sick animals. Additionally, the RF reader systems may use energy saving techniques to increase performance life and allow them to be used in remote areas (e.g., where no standard electrical power is available). The RF readers systems may also provide redundancy in relaying data to remote computer systems.

Still other implementations relate to apparatus, systems, and techniques for performing all or part of such processes. Since there are many alternative variations, modifications and substitutions within the scope of the invention, one of ordinary skill in the art should consider the protected scope of the invention from a review of the claims appended hereto as considered in the context of the prior art and the various descriptions of this application.

Many other features will be evident from the remainder of this application in light of a more exhaustive understanding of the numerous difficulties and challenges faced by the prior art, which in turn will be evident to those skilled in the art.

BRIEF DESCRIPTION OF THE DRAWINGS

For a more complete understanding of the present invention and its implementations, and the features thereof, reference is now made to the following descriptions taken in conjunction with the accompanying drawings, in which.

Like reference numerals are used for similar elements of various embodiments.

DETAILED DESCRIPTION

Overview

Animals may be managed by a variety of systems, processes, and techniques in an effort to improve their health and administration thereof. In one general implementation, identification techniques may include monitoring the movement, water consumption, and/or feed consumption of animals and predicting which ones may have health conditions based on their movements and/or consumption. For instance, movements of cows may be used to predict which cows are sick.

Tracking of the animals may, for example, be provided by RFID techniques, in particular meshing RFID tag readers. By creating a mesh, animals may be detected over a large area. However, using a number of tag readers increases complexity, both in the amount of data, transferring the data, and analyzing it. Intelligently handling the data at the tag reader level can assist in managing the complexity in many implementations.

Tag readers may also be managed intelligently to provide redundancy to the mesh and/or extend their life, allowing them to be used in remote locations. In remote applications, it is much more likely that various tag readers may experience failures (whether temporary or extended). By being able to overcome failures of a particular tag reader, the mesh may continue functioning, although possible at reduced capacity.

Still other implementations relate to apparatus, systems, and techniques for performing all or part of such processes. Since there are many alternative variations, modifications, and substitutions within the scope of the invention, one of ordinary skill in the art should consider the protected scope of the invention from a review of the claims appended hereto as considered in the context of the prior art and the various descriptions of this application.

While the inventive concepts are much more basic than any particular implementation, one of ordinary skill in the art can gather a partial appreciation for some of the possible benefits of the broader concepts and possible interplay between various elements of the concepts in the course of considering example implementations, some of which are described in detail below.

The systems, processes, and techniques depicted herein allow for efficient and effective animal management that draws on reliable yet efficient predictive assessment, together with related measures for sorting and data management to achieve comprehensive animal management. The result yields multiple applications in the feedlot industry, as well as in the dairy, ranching, and packing industries, and in portable systems for use in veterinary applications. As will be evident, some aspects of the invention can even be appreciated in fowl, human, or other mono-gastric populations. Occasional paragraph or section headings have been used for ease of reference, but such headings generally should not be read as affecting the meaning of the descriptions included in those paragraphs and sections.

Example Animal Management System

Figure 1:
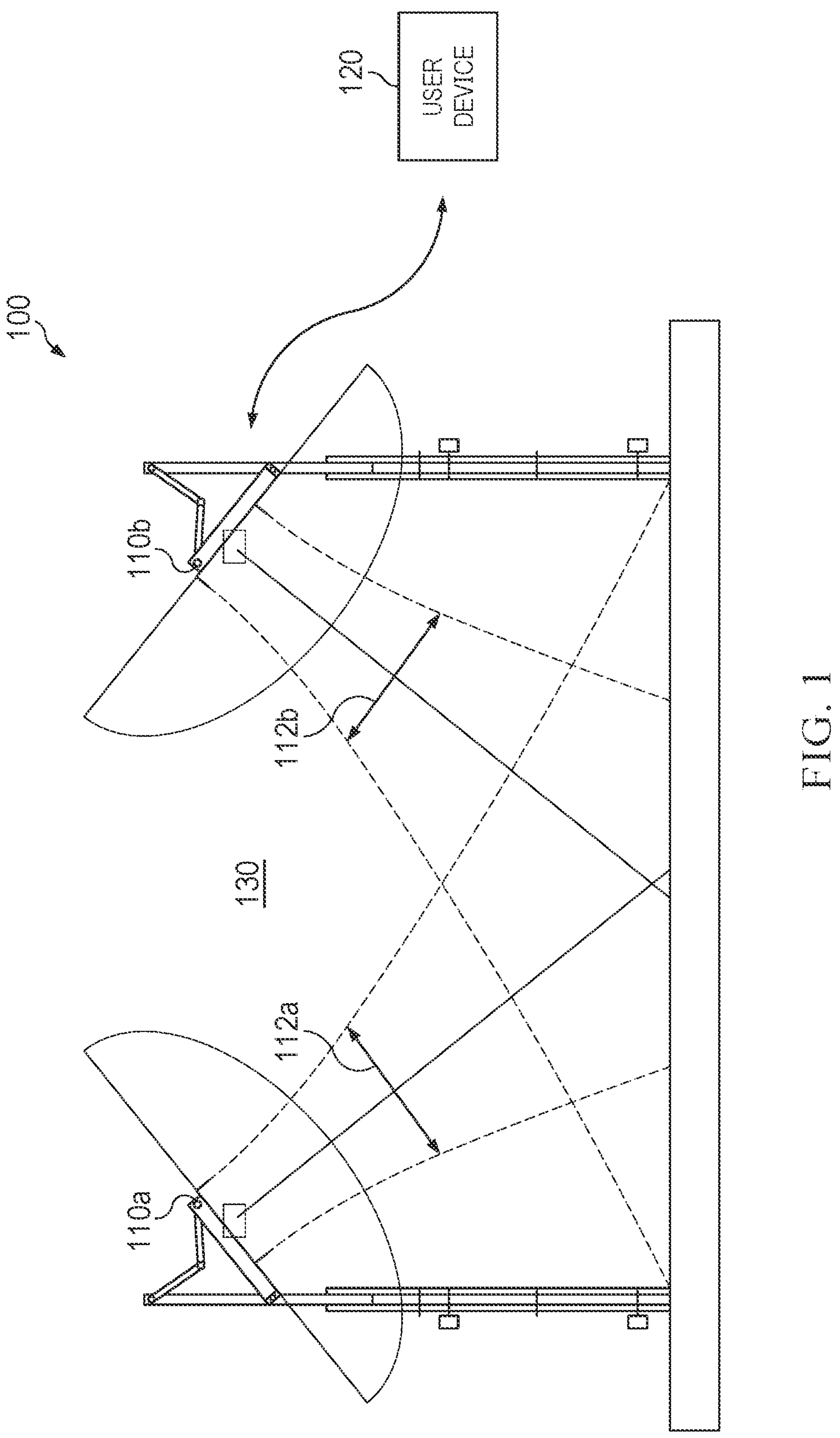
FIG. 1 is a line drawing illustrating selected components of an example system for animal management.

FIG. 1 illustrates selected components of an example animal management system 100. Among other things, system 100 includes a first radio-frequency (RF) reader system 110*a*, a second RF reader system 110*b*, and a user device 120. In general, RF reader systems 110 are able to scan for and detect radio-frequency identification (RFID) tags on animals. Example operating frequencies for scanning and detecting RFID tags are in the very-high frequency (VHF) and ultra-high frequency (UHF) bands.

As can be seen, RF reader systems 110 are located on the opposite sides of a passage 130 and have beamwidths 112 that cover at least part of the passage. Thus, RFID tag-carrying animals moving through passage 130 should be detected by one or both of the RF reader systems. Passage 130 may, for example, be between the opposite ends of a gate to count animals passing through from one pen or along an alleyway to ensure highly accurate scans of animals that are being received or shipped.

Figure 2:
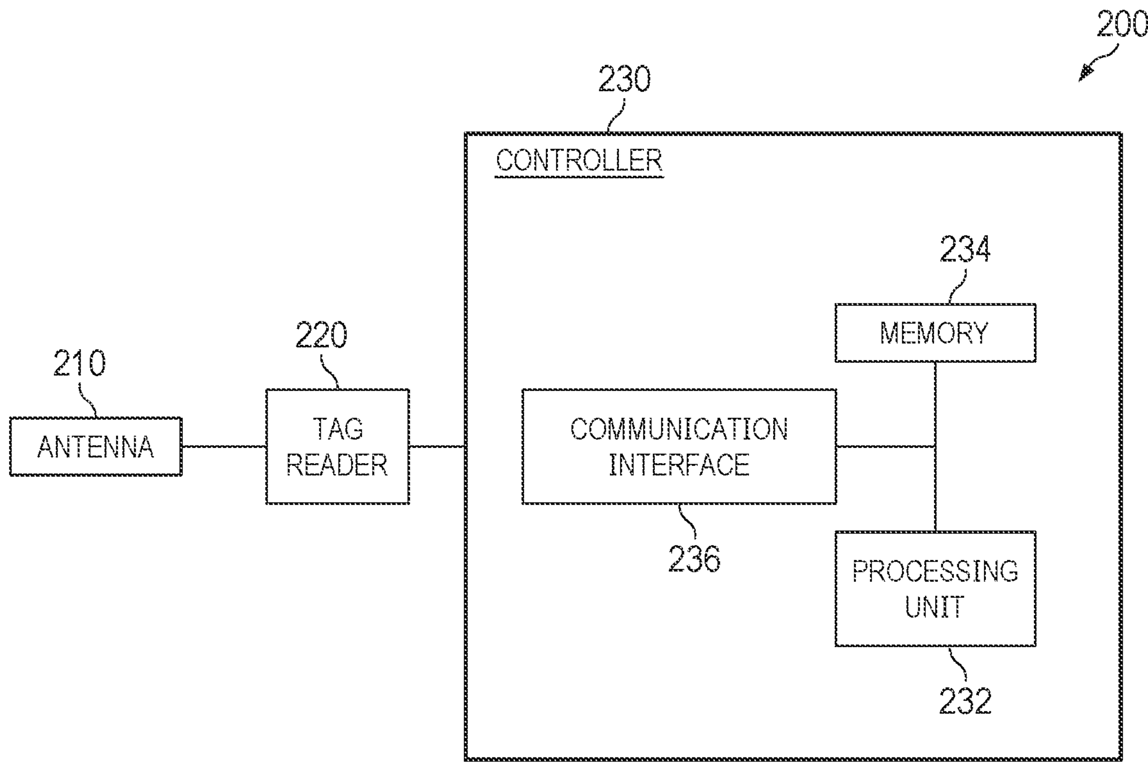
FIG. 2 is a block diagram illustrating selected components of an example RF reader system for an animal management system.

FIG. 2 illustrates selected components of an example RF reader system 200. RF reader system 200 includes an antenna 210, a tag reader 220, and a controller 230.

Antenna 210 is able to sense an animal-mounted RFID tag. Antenna 210 may, for example, sense a tag at about 8-12 m. Antenna 210 could be a dipole antenna, a patch antenna, or any other appropriate type of antenna.

Tag reader 220 is coupled to antenna 210 and detects the presence of an RFID tag in a zone of the antenna and may also read an identifier off the tag. Tag reader 220 may also upload data from the tag to controller 230 and download messages to the tag from the controller. Tag reader 220 may, for example, be an RFID reader, such as the RF-350 from Harting Electric GmbH & Co. of Espelkamp, NRW (Germany).

Controller 230 is adapted to receive data regarding a tag in the zone of the antenna and process the detection via a processing unit 232. In operation, controller 230 may generate scans for tags at a predetermined time (e.g., every 5 seconds). Detections of an RFID tag, such as, for example, the time of detection and the identifier for the tag, may be stored in memory 234 (e.g., in a table or database). The memory may then be updated with items like the last time the animal had been detected by the RF reader system.

Processing unit 232 may generally include any logic-based device for automatically processing data (e.g., a microprocessor or a microcontroller). In particular implementations, controller 230 may include more than one processor.

Memory 234 may include volatile memory (e.g., random-access memory, registers, etc.) and/or non-volatile memory (e.g., disk memory, solid-state memory, read-only memory, etc.). Memory 234 may store instructions for processing unit 232 and data regarding the animals being monitored.

A communication interface 236 allows controller 230 to send and receive information (e.g., data and instructions) to remote computer systems. For example, controller 230 may send data regarding the detection of an animal and receive instructions for operating tag reader 220. Communication interface 236 may operate by wireline (e.g., RS-232, RS-485, USB, Ethernet, etc.) or wireless (e.g., Bluetooth, Wi-Fi, ZigBee, cellular, satellite, etc.) techniques.

Communication interface 236 may, for example, allow communication with user device 120 in FIG. 1, another RF reader system, or a server system (whether dedicated or cloud-based). User device 120 may, for example, be a personal computer, a laptop computer, a tablet, or a smart phone. In general, user device 120 may be any computerized device that can receive, send, and process information.

As mentioned previously, the animals should be wearing an RFID tag when traversing passage 130. RFID tags may be in place on the animals when they arrive at system 100 or placed on them when they arrive. At base, the RFID tags allow the presence of animals to be detected. But the RFID tags may also allow the location of each animal to be determined. For example, the detection of a tag by an RF reader system 110 may allow the general location of an animal to be determined based on being near the RF reader system (e.g., to within 10 m). And in areas with multiple RF reader systems, the position may be determined in more accurate manners (e.g., based on time of arrival of signals from the tags at multiple RF reader systems). In some implementations, the RFID tags themselves may determine their position based on Global Positioning System (GPS) measurements by the tags.

The RFID tags may communicate with the RF reader systems in a passive or an active manner. In a passive manner, the RFID tags may be energized by signals from an RF reader system and use this energy to transmit their identifiers, along with any other information (e.g., data about the associated animal and/or the functioning of the RFID tag), back to the RF reader system. In an active manner, the RFID tags may generate their own power (e.g., by chemical reaction) and transmit their information to the RFID reader systems (e.g., when requested or on a schedule). Active RFID tags achieve a sensitivity boost due to requiring less power from an RF reader system. The time that either the passive or active signals arrive at the RF reader systems may be used for the position determination.

In particular implementations, RFID chips on the tags may store identifiers for an animal and/or information history on the animal. Suitable RFID chips are available from lmpinj of Seattle, WA (USA) and NXP Semiconductors of Eindhoven, North Brabant (Netherlands).

The RFID tags may also be readable visually (such as by a bar code or simply a number or color) as well as wirelessly to facilitate the sorting and management of the animals in pens. In particular implementations, the RFID tags may be color coded based on which population each animal falls into at the time.

As mentioned previously, in particular modes of operation, RF reader systems 110 may contemporaneously scan for RFID tags passing through passage 130. Because the beams from both systems 110 overlap, they form a unified counting mesh (UCM). If an animal passes through the beams of both RF reader systems, its RFID tag may be detected by both systems. To obtain an accurate count and inventory of the animals traversing passage 130, resolving multiple reads of the same RFID tags, either by a single RF reader system or by multiple RF reader systems, should be accomplished to establish an accurate count and inventory of the animals traversing the passage.

RF reader systems engaged in a UCM are often set up and taken back down. That is, they are either not permanently deployed or permanently running a counting session, and as such, the battery usage is typically of less concern. Because of this, the RF reader systems may run at a higher power (e.g., 1 W, as opposed to 0.4 W in a regular scanning procedure), a quicker duty cycle (e.g., 90-100% as opposed to 40-50% in regular scanning procedure), and engage their mesh radios more frequently (e.g., each time a tag is scanned as opposed to grouping tag scans over an interval of time in a regular scanning procedure). One RF reader system in a UCM typically acts as a designated communicator (e.g., essentially a gateway that handles communications to the user device, the Internet, or to other readers in other mesh networks).

The designated communicator is typically allocated by the user device. RF reader systems will send the unique tags they detect to the designated communicator, which will dedupe identical tags as they come in, and store or transmit the unique tags back to the user device (or other designated system).

In more detail, each time an RF reader system in the UCM reads a tag, the system checks to see if it has already detected the RFID tag. If the RF reader system is not a designated communicator, any unique tag identifier is sent along to the designated communicator. Upon receipt, the designated communicator also checks to see if the relayed tag identifier has already been seen either by itself or by other RF reader systems in the UCM. The designated communicator logs the unique RFID tag scans. If there is a user device connected, the designated communicator may send the unique RFID tag scans to the it. Otherwise, the designated communicator will wait until the mesh counting session has ended to collate the final list of unique tags to send to the user device.

System 100 has a variety of features. Having accurate counts of animals is important in maintaining records, planning where animals are located or relocated to, shipping animals, and receiving animals. Manual counting of animals can produce erroneous counts, especially when animals pack densely together. Traditionally, low frequency (LF) RFID has been used to electronically count animals, but they have to be funneled through narrow chutes and captured one at a time, due to the distance and read rate limitations of LF. LF tags, for example, only use magnetic fields/waves, whereas UHF uses electromagnetic fields/waves. And since LF requires communication by inductive coupling, the distances cannot extend more than 1-1.5 m. UHF, on the other hand, communicates through backscatter, which when used with sensitive panel antennas and low power tag chips, gives the range and speed that LF cannot.

But even using UHF, with its substantially improved read distances and read rates, can still produce inaccurate counts—animals may bunch up together and obscure their tags (e.g., on their ears), the tags may be oriented sub-optimally, etc. By meshing multiple readers together, a longer and wider read zone can be created, ensuring redundancy in the RF field so that the RFID tags have a much higher chance of being detected.

In certain implementations, system 100 may also include an animal analysis system (e.g., a local or remote server system), which is coupled to an RF reader system through a communication network. The communication network may, for example, include one or more wide area networks (e.g., the Internet) and/or local area networks (e.g., Ethernet). The communication network may, for example, be composed of a collection of wireline and wireless networks (e.g., the Internet, a cellular network, and/or a Wi-Fi network).

The communication network may be able to convey information (e.g., data and instructions) to the animal analysis system and user device 120. For example, using the communication network, an RF reader system may send an alert to the user device. The alert may, for example, be about the operations of an RF reader system 110. An analysis system may also be able to log in to an RF reader system (e.g., by establishing a client-server relationship) to retrieve data regarding the operation of system 100 and/or particular animals. In certain implementations, the analysis system may receive the tag scans, in real-time or in batch.

Figure 3:
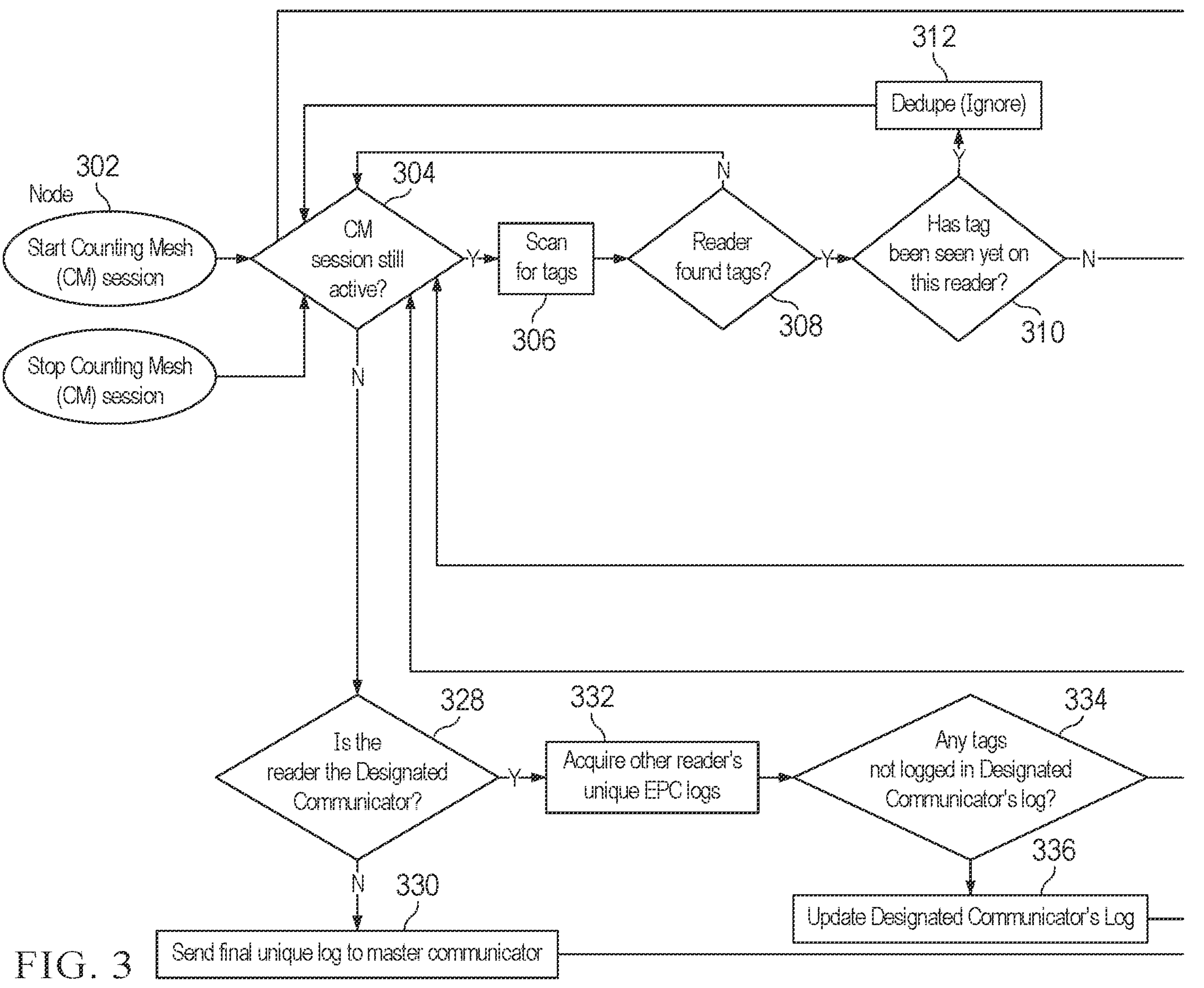
FIG. 3 is a block diagram illustrating selected operations of an example process for animal management.
Figure 3:
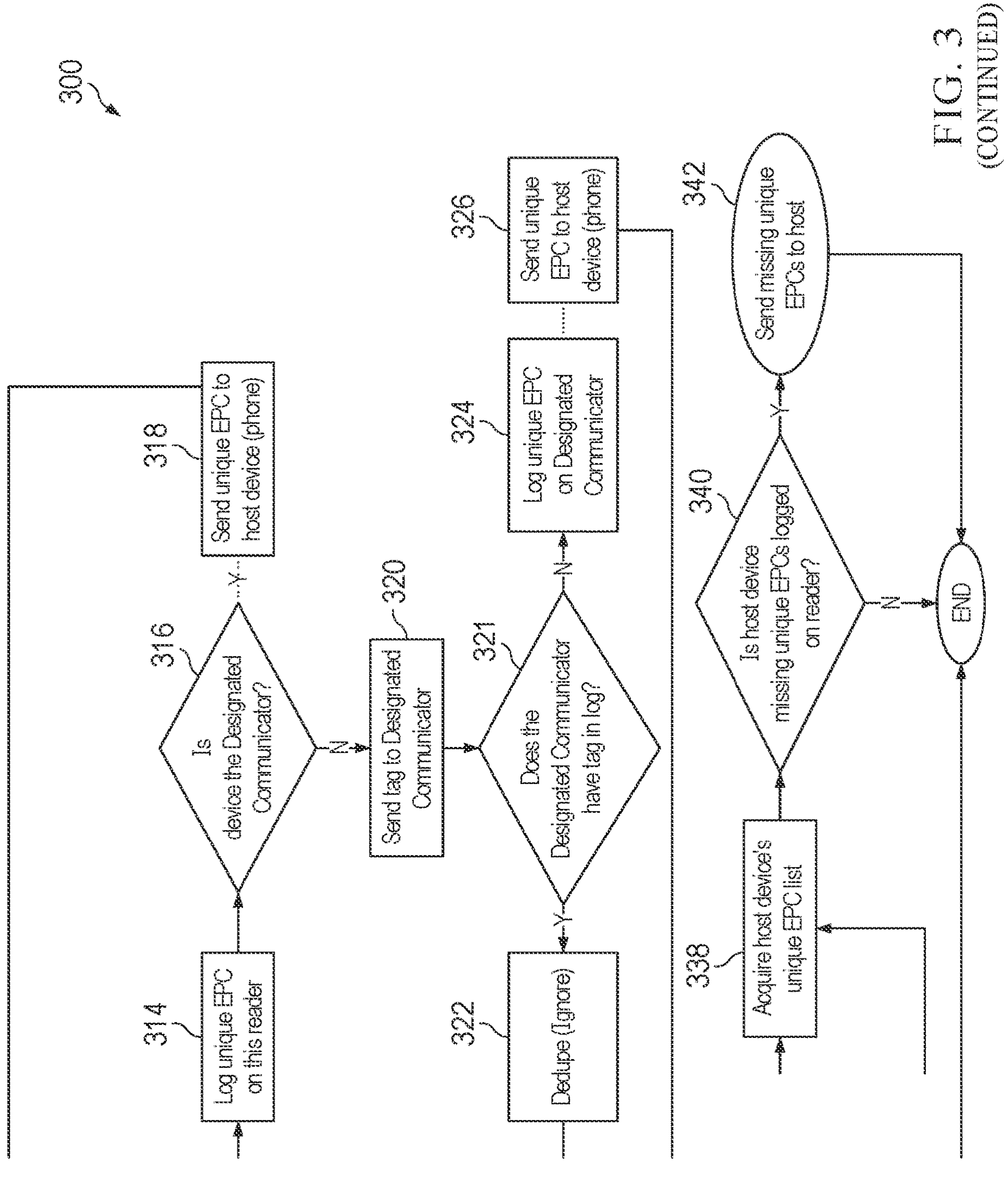

FIG. 3 illustrates selected operations of an example process 300 for multiple RF reader systems to operate with each other when reading the same area (e.g., in a UCM). Process 300 may, for example, be implemented by a system similar to system 100. During process 300, one RF reader is operating as a designated communicator for the mesh.

Process 300 calls for waiting for an instruction to begin a mesh counting session (operation 302). The instruction may, for example, be sent from a user device to the designated communicator, which may relay the instruction to the other RF reader systems in the mesh.

Once a mesh counting session has begun, process 300 calls for checking whether the mesh counting session is still active (operation 304). The mesh counting session may, for example, be deactivated based on an instruction from the user device.

If the mesh counting session is still active, process 300 calls for scanning for RFID tags (operation 306). Scanning for RFID tags may be continuous or so frequent as to effectively be continuous (e.g., 1 Hz).

After scanning for RFID tags, process 300 calls for determining whether any RFID tags were detected (operation 308). If a scan generates no detections of RFID tags, process 300 calls for again determining whether the mesh counting session is active (operation 304).

If, however, an RFID tag was detected, process 300 calls for determining whether the detected RFID tag had previously been detected by the RFID reader system (operation 310). This may, for example, be accomplished by comparing an identifier for the detected RFID tag to a list of RFID tags already detected by the RFID reader system. If the detected RFID tag has already been detected by the RFID reader system, process 300 calls for ignoring the detected RFID tag (operation 312) and again determining if the mesh counting session is active (operation 304).

On the other hand, if the detected RFID tag has not already been detected by the RFID reader, process 300 calls for logging the unique RFID tag identifier on the RF reader system (operation 314) and determining whether the RFID reader system is the designated communicator (operation 316). If the RFID reader system is the designated communicator, process 300 calls for sending the unique RFID tag identifier to the user device if connected (operation 318) and again checking whether the mesh counting session is active (operation 304).

Alternatively, if the RFID reader system is not the designated communicator (operation 316), process 300 calls for sending the RFID tag identifier to the designated communicator (operation 320). The designated communicator then checks whether the RFID tag identifier is in its log (operation 321) and if it is, process 300 calls for ignoring the RFID tag identifier (operation 322) and again checking whether the mesh counting session is active (operation 304).

If, however, the RFID tag identifier is not in the designated communicator's log, process 300 calls for logging the RFID tag identifier into the designated communicator's log (operation 324), sending the RFID tag identifier to the user device if connected (operation 326), and again checking whether the mesh counting session is active (operation 304).

Once the mesh counting session has ended, process 300 calls for determining whether the RFID reader system is the designated communicator (operation 328). If the RFID reader system is not the designated communicator, process 300 calls for sending the final unique log of RFID tag identifiers scanned by the RF reader system to the designated communicator (operation 330). Process 300 is then at an end for that RFID reader system.

If, however, the RFID reader system is the designated communicator for the mesh, process 300 calls for acquiring logs of unique RFID reader identifiers from the other RF reader systems in the mesh (operation 332) and determining whether any of the RFID tag identifiers in the logs of the other RF reader systems are not in the log for the designated communicator (operation 334).

If none of the RFID tag identifiers in the logs of the other RF reader systems are missing from the log for the designated communicator, process 300 calls for acquiring the user device's list of RFID tag identifiers (operation 338). On the other hand, if any of the RFID tag identifiers in the logs of the other RF reader systems are missing from the log for the designated communicator, process 300 calls for updating the designated communicators log (operation 336) to include those other RF tag identifiers and acquiring the user device's list of RFID tag identifiers (operation 338).

After acquiring the list of RF reader identifiers from the user device, process 300 calls for determining whether the user device log is missing any of the RFID tag identifiers in the log of the designated communicator (operation 340). If the user device is not missing any of the RFID tag identifiers in the log of the designated communicator, process 300 is at an end. If, however, the user device is missing any of the RFID tag identifiers in the log of the designated communicator, process 300 calls for sending the missing RFID tag identifiers to the user device (operation 342). Process 300 is then at an end.

Process 300 has a variety of features. For example, process 300 reduces the amount of messaging traffic during a mesh counting session by having each RF reader system maintain its own log of unique RFID reader tags. Additionally, process 300 allows a user device to be updated in real time during a mesh counting session regarding the number of RFID tag identifiers scanned and the ones that actually have been scanned. Process 300 also validates the logs of the designated communicator against the logs of the other RF reader systems in the mesh counting session to make sure no RFID tag identifiers were missed during the session.

Figure 4:
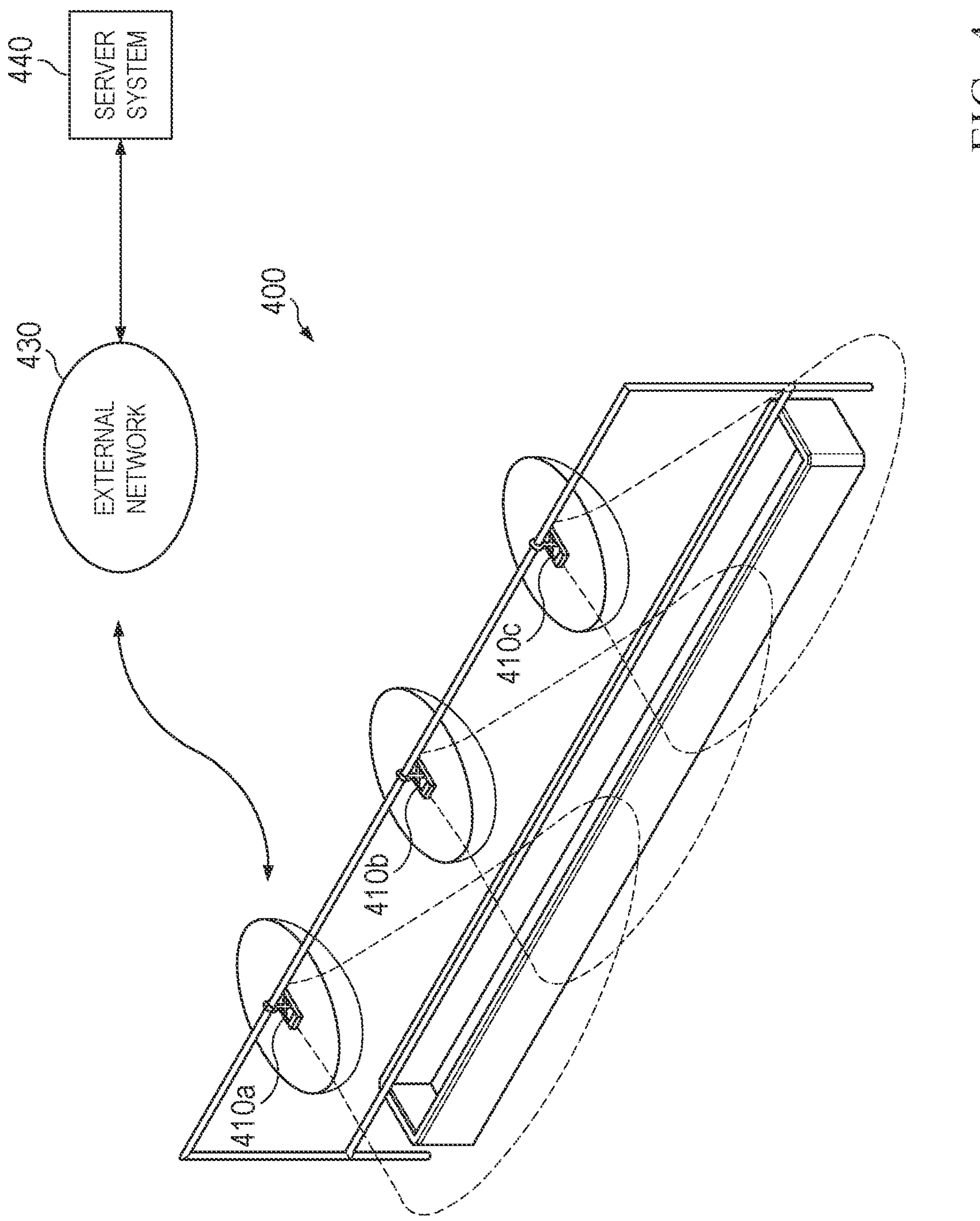
FIG. 4 is a line drawing illustrating selected components of another example system for animal management.

FIG. 4 illustrates selected components of another example animal management system 400. Among other things, system 400 includes RF reader systems 410. However, unlike system 100, RF reader systems 410 are arranged so they each primarily scan a separate geographic area, which could in combination cover the same physical structure. (There is, however, some overlap of the beams at the edges to ensure no missed reads.) System 400 may, for example, be used along a feed bunk that is longer than one reader system can effectively cover.

In certain modes of operation, one RF reader system 410 typically acts a designated communicator for the other RF reader systems 410, although the RF reader system acting as the designated communication can be changed during operation (discussed below). The designated communicator is able to accumulate data from the other RF readers 410 and communicate it through an external network 430 (e.g., acellular network or the Internet) with a server system 440. The designated communicator can also receive data from the server system (e.g., updated operation parameters or programming updates) and distribute them to the other RF reader systems. The server system may include one or more servers and may be dedicated a physical unit or cloud based.

In operation, RF reader systems 410 may contemporaneously scan for RFID tags in the area covered by each RF reader systems. Because the beams from systems 410 overlap slightly, they form a unified area mesh (UAM). If an animal enters any of the beams, its RFID tag may be detected. However, an animal may be in two beams at once in some orientations. To obtain an accurate count and inventory of the animals in the combined area covered by the RF reader systems, resolving multiple reads of the same RFID tags, either by a single RF reader system or by multiple RF reader systems, should be accomplished to establish an accurate count and inventory of the animals in the area.

In particular modes of operation, each RF reader system creates its own time window where it is scanning for tags and relays the tags detected during that window to the designated communicator. Basically, the tag scan window bundles tag scans spanning a specific range of time into a single transmission. This improves battery life of the reader system, as the mesh radio is not activated every single tag detection, and it improves data cost as hundreds of scans from a single RFID tag can be summarized in a few dozen bytes.

To dedupe tag scan windows, the designated communicator may hold the tag scan windows it receives in a queue. It may wait until an appropriate amount of time has passed (e.g., an additional duration of 1.5 tag scan windows) to ensure that any other device that could have read that RFID tag would send in its data. The designated communicator can then look at each RFID tag in the tag scan windows that it has and see if there are duplicates. In the case of duplicates, the designated communicator may look at the total duration from each duplicate record and keep the longer one. Other factors, such as an average received signal strength indicator (RSSI) value, may be used in the deduplication process in some implementations.

In particular implementations, multiple RF reader systems 410 may have the capability to be a gateway, router, or endpoint for various meshing schemas (e.g., Zigbee, and Bluetooth Low Energy (BLE)). An endpoint is basically an RF reader system that scans for tags and sends its data to other RF reader systems (e.g., a router or a designated communicator), but does not act to collect and send data from other RF reader systems. A router also scans for tags and sends its data to other RF reader systems (e.g., another router or a gateway), but it also collects tag scan data from other RF reader systems and sends it to other RF reader systems (e.g., another router or the gateway). The gateway, which is often the designated communicator, is also able to scan for tags, but it also collects tag scan data from other RF reader systems (endpoints and routers) and sends collective tag scan data to other networks (e.g., a cellular network or the Internet). However, at some points, a gateway may just send its tag scan data, as explained below.

But while multiple of the RF reader systems may have the capability to act as a gateway, they do not all need to have their own network connectivity, at least at one time. Instead, allowing the RF reader systems to switch roles between gateway, router, and endpoint produces several benefits. Eventually, the reader systems or a remote host (e.g., a smart phone, a local server system, or a remote server system) could "learn" which RF reader systems have high traffic throughout a day and reconfigure the network around and away from RFID tag hotspots, since the tag reader itself is also power intensive. Moreover, a server connected network would eventually be able to identify patterns in device power usage, based on how many animals appear at different times, durations of stays, and power generated throughout the day, and potentially use this information to assign schedules for when "low use" RF reader systems become designated communicators.

The ability to switch between being an endpoint and a gateway may also improve network integrity. If an RF reader system that is meshed in a network (e.g., a UAM) does not receive an acknowledgment from the designated communicator that its message was delivered (either to a specific RF reader system or to the Internet), then that system can decide how to escalate. Depending on a variety of factors, like the system's own battery state, number of nearby nodes, availability of nearby designated communicators, the system can attempt to route its message to a different designated communicator, or temporarily re-enable its connectivity module to transmit its own message to another network. In this manner, the mesh network can have temporary gateways that ensure multiple opportunities for internetwork connectivity.

The ability to switch between being an endpoint and a gateway may also reduce costs, particularly for cellular connections. The pricing structure of cellular plans can sometimes penalize systems for sending too much data or downloading too much data. While the tag scan window is designed to compress and summarize data, these messages still have to be sent. Readers in a mesh may experience different amounts of animal traffic, resulting in some RF reader systems (especially designated communicators) sending drastically more messages than other systems. A limit can be set on the designated communicator so that if a message count or data cap is reached, then it signals another RF reader system to activate itself as a gateway.

Additionally, device configurations and firmware updates may be downloaded to update RF reader system reader parameters or include new functionality. If a configuration applies to multiple readers in a mesh, then one RF reader system reader could be responsible for receiving updates (e.g., from the remote host) and distributing firmware or configuration files to other RF reader systems. This way, the same file does not have to be downloaded by each system, which lowers the cellular network usage.

In certain modes of operation, server system 440 may analyze the data received from RF reader systems 410 to improve animal management and RF reader system operation. For example, the server system could determine that an animal is not showing up to eat and/or drink or is loitering in one area too long and issue an alert. Additionally, because the server system could receive data from a mesh network of a yard/area, the server system could identify if an animal is in a pen it is not supposed to be in. Also, the server system could determine a total headcount of animals scanned each day over the yard as a way to manage inventory. Reports could also be generated based on how movement patterns change with respect to weather, age of cattle, time on yard, and cattle characteristics.

The server system could also look at tag scan window timestamps and stitch together RFID tags as necessary. For example, an animal that visited for 10 minutes could be reported in two tag scan windows. The server system could determine if the end of duration period tag scan window (e.g., which could be imported as one row into a database with a duration) aligns with the beginning of duration period of the next tag scan window and merge the two results together if there is alignment.

Figure 5:
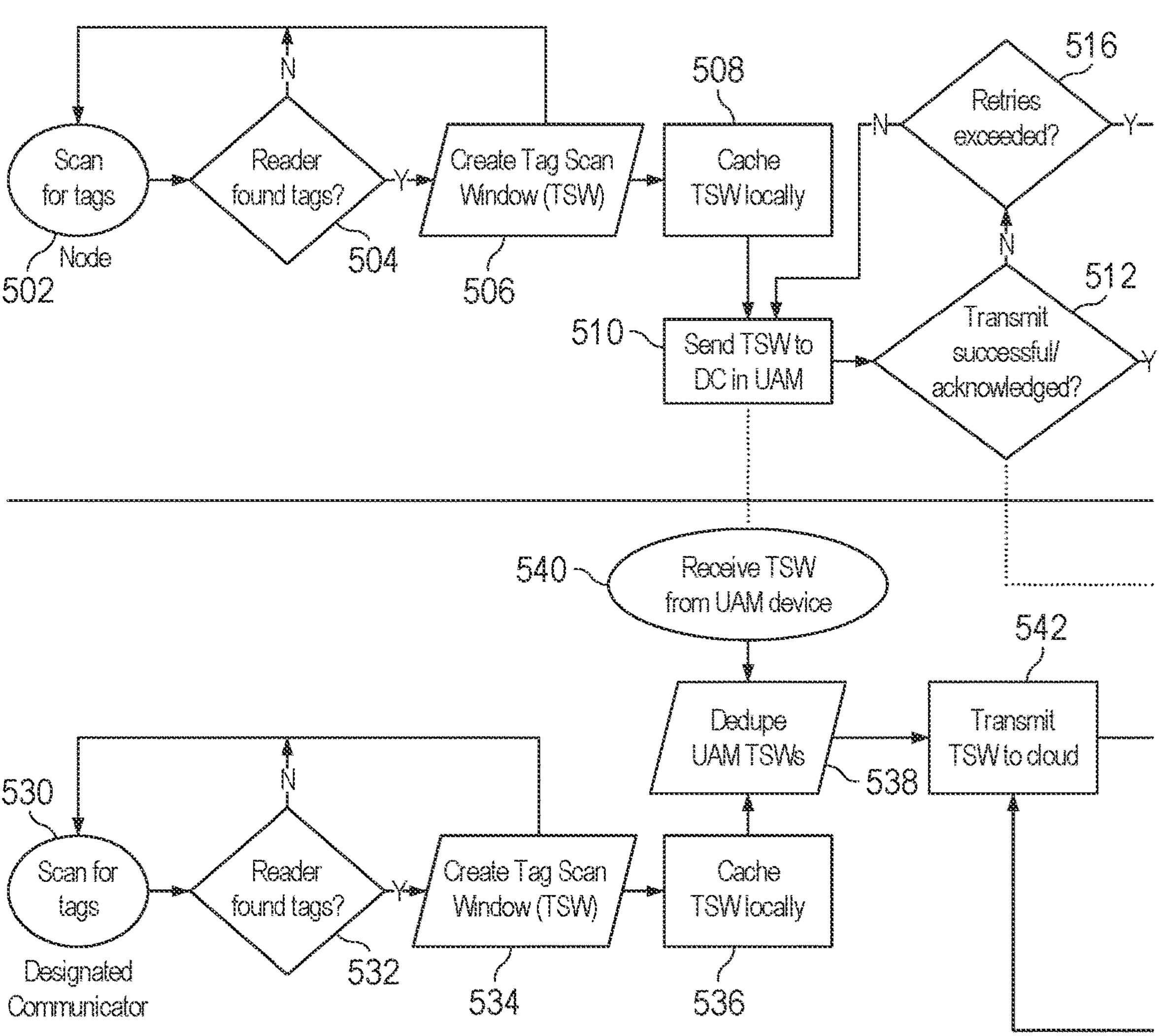
FIG. 5 is a flowchart illustrating selected operations of another example process for animal management.
Figure 5:
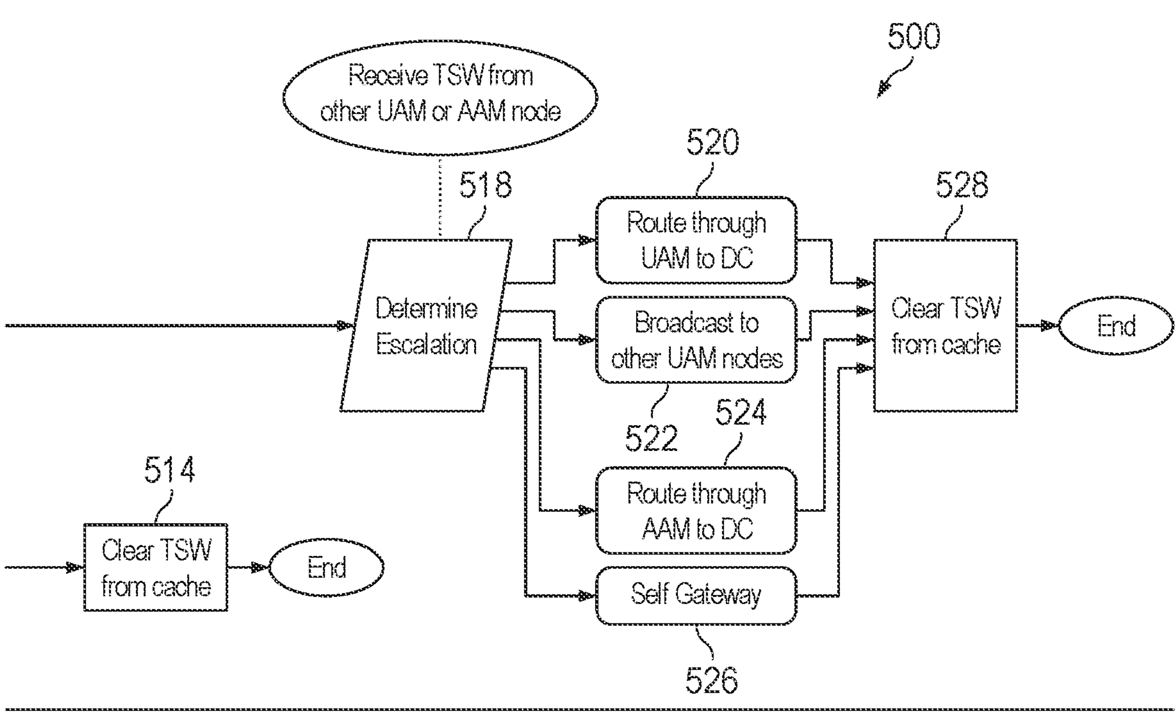
Figure 5:
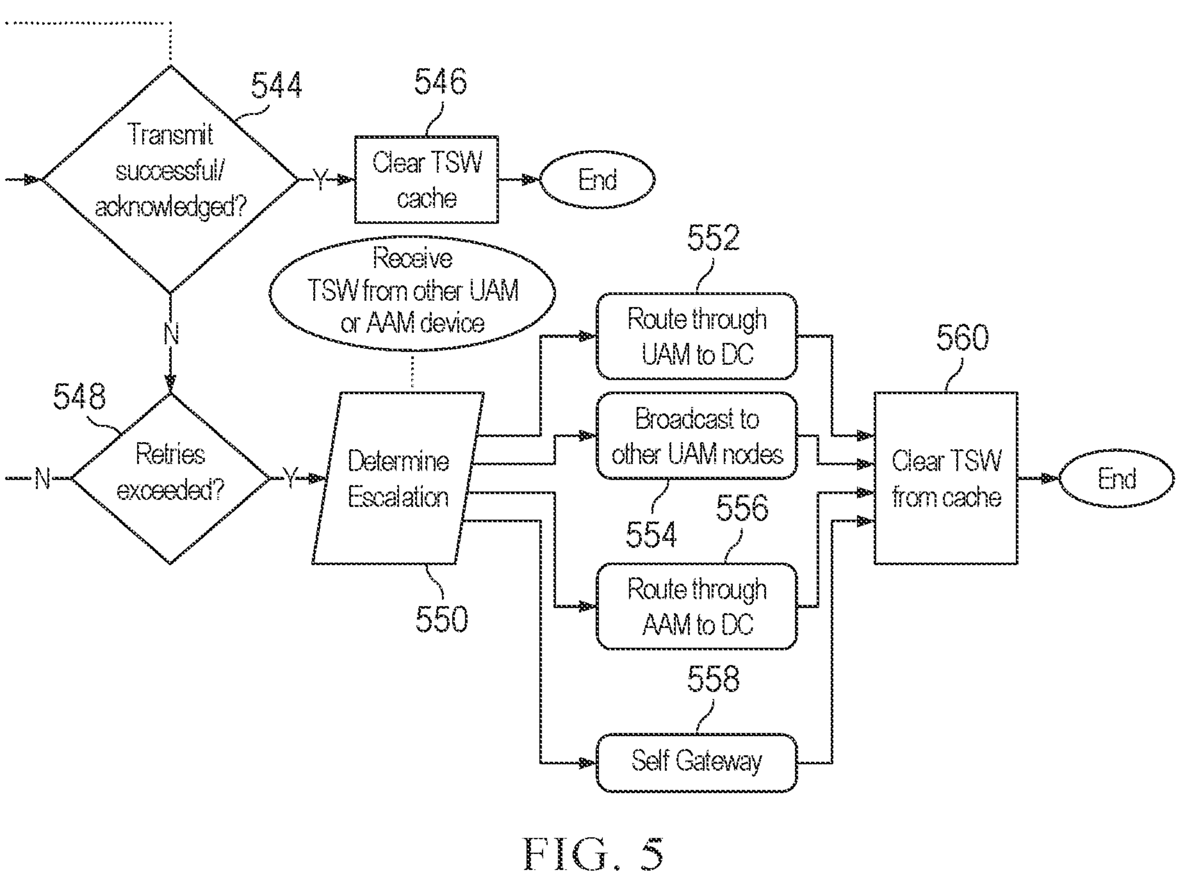

FIG. 5 illustrates an example process 500 for animal management. Process 500 may, for example, be implemented by a system similar to system 400. Typically, one RF reader system behaves as the designated communicator in the UAM, and the other RF reader systems behave as either nodes or endpoints in the UAM.

Process 500 calls for scanning for tags at a node RF reader system (operation 502). The scanning may, for example, be accomplished on a regular basis (e.g., every 10 s). Process 500 also calls for determining whether any RFID tags were detected during a scan (operation 504). If no RFID tags were detected, process 500 again calls for scanning for RFID tags (at the designated time).

Once an RFID tag is detected, process 500 calls for generating a tag scan window for the node RF reader system (operation 506). A tag scan window is basically a period (e.g., 1-minutes) in which the detecting RF reader system will scan for RFID tag on a more frequent basis (e.g., 1 Hz). Once an RFID tag is detected, frequent scans will provide data about an animal (e.g., how long it stayed in the particular area). Process 500 then calls for continuing to scan for tags in the tag scan window.

Once the tag scan window is complete, process 500 calls for caching the tag scan window locally (operation 508) and sending the tag scan window to the designated communicator for the UAM (operation 510). Process 500 then calls for waiting to receive an acknowledgment that the tag scan window was processed by the designated communicator (operation 512).

If the tag scan window was successfully processed by the designated communicator, the tag scan window is cleared from the cache (operation 514), and process 500 is at an end for that tag scan window. The node RF reader system would typically return to operation 502.

If no acknowledgment is received from the designated communicator, however, process 500 calls for determining whether the number of send attempts for the tag scan window has been exceeded (operation 516). If the number of send attempts has not been exceeded, process 500 calls for again sending the tag scan window to the designated communicator (operation 510).

If, however, the number of send attempts has been exceeded, process 500 calls for escalating the sending of the tag scan window (operation 518). For example, the RF reader system could try routing the tag scan window via a UAM to the designated communicator (operation 520), broadcasting the UAM to other UAM nodes (operation 522), routing the tag scan window through an Aggregate Area Mesh AAM (discussed below) (operation 524), or becoming a gateway and routing the tag scan window to a remote host (operation 526). In particular, implementations, the RF reader system may pick one of these operations or try them in succession until a successful transmission of the tag scan window is complete. Once the tag scan window has been transmitted successfully, process 500 is at an end. The node RF reader system would typically return to operation 502.

Process 500 also calls for the designated communicator to be scanning for tags contemporaneously with the other RF readers in the UAM (operation 530). Process 500 calls for determining whether any RFID tags were detected during a scan (operation 532). If no RFID tags were detected by the designated communicator, process 500 again calls for scanning for RFID tags (operation 530).

Once RFID tags are detected during a scan, process 500 calls for generating a tag scan window (operation 534). Process 500 then calls for continuing to scan for tags in the tag scan window. During these operations, the designated communicator may also be receiving tag scan windows from other RF reader system in the UAM (operation 540).

Once a tag scan window is complete at the designated communicator, the tag scan window is cached locally on the designated communicator (operation 536), and the designated communicator checks whether any tag scan windows have been received from another RF reader system in the UAM and dedupes them (operation 538).

Recently received tag scan windows from other RF reader systems in the UAM may have duplicate reads of the same animal (e.g., when the animal is standing between two RF reader systems). Deduping the tag scan windows may, for example, be accomplished by determining which tag scan window has the most detections for an RFID tag and removing the detections from the other tag scan window.

Once the tag windows have been deduped, process 500 calls for transmitting the tag scan windows to a remote server system (operation 542). Additionally, if a tag scan window is not generated by the designated communicator in a time close enough to a received tag scan window, the received tag scan window can be transmitted. There would be no deduping of this tag scan window as there is nothing to dedupe it against.

If a tag scan window from another RF reader system is transmitted by the designated communicator, process 500 calls for determining whether the transmission was successful (operation 544), and if it was, sending an acknowledgment of this to the node RF reader system and clearing the local cache of the tag scan window (operation 546). Process 500 is then at an end for that tag scan window. The designated communicator would typically return to operation 530.

If the transmission to the remote host is not successful, process 500 calls for determining whether the number of send attempts has been exceeded (operation 548). If the number of send attempts has not been exceeded, process 500 calls for again sending the tag scan window to the server system (operation 542).

If, however, the number of send attempts have been exceeded, process 500 calls for escalating the sending of the tag scan window (operation 550). For example, the RF reader system could try routing the tag scan window via the UAM to another designated communicator in the UAM if one exists (operation 552), broadcasting the tag scan window to other UAM RF reader systems in an effort to reach another designated communicator in the UAM (operation 554), routing the tag scan window through an AAM (discussed below) (operation 556), or becoming a gateway and routing the tag scan window to the remote host (operation 558). Often, a designated communicator may already be a gateway, but in situations where it is not, operation 558 may be implemented.

In particular, implementations, the designated communicator may pick one of these operations or try them in succession until a successful transmission of the tag scan window is complete. Once the tag scan window has been transmitted successfully, the tag scan window is cleared (operation 560), process 500 is at an end. An acknowledgement message of successful transmission of the tag scan window can also be sent to the associated endpoint. The designated communicator would typically return to operation 530.

Process 500 has a variety of features. For example, process 500 uses tag scan windows to temporarily increase scans for animals, increasing energy efficiency. Additionally, process 500 allows for deduping of scans that detect the same RFID tags. Thus, an animal is not presented as being associated with multiple RF reader systems. Additionally, the deduping is performed in a manner to associate the animal with the RF reader system with which the animal has the most affinity. Process 500 also allows RF reader systems to switch their operating mode (e.g., from endpoint to gateway) if necessary. Thus, a balance between energy efficiency and securing data transmission is achieved.

Tag scan windows, briefly defined above, may be a data structure (compiled in Google's protobuf, for example) that are designed for an area monitoring use case. They may accomplish several things: 1) lower the amount of data transmitted; 2) reduce power consumption by lowering external radio usage; 3) simplify data recording; and 4) reduce false positive tag scans.

The area monitoring use cases (present in UAM and AAM) are intended to be operating remotely and without access to a mainline, hardwired electrical source. As such, the battery life needs to be preserved as much as possible. To avoid running the tag reader at all hours of the day, the tag reader goes to sleep when it does not detect tags. After a delay, the tag reader will do a singular "pulse" read to see if there are tags in the field. If there are no RFID tags detected, then tag reader may go back to sleep.

The delay can be configurable, and can be extended during the night-time hours when little-to-no activity is expected. Tag scan windows are initially created after a pulse read returns tag detections in the read field. Tag scan windows have a maximum time (i.e., will end after X minutes, regardless of tags still being scanned). This timeout ensures that data regarding animals that are loitering, or tags that have fallen off in the read zone, will still get transmitted.

Tag scan windows could also have a timeout, such that if no tags are detected after a certain time from of initiation (e.g., one minute and/or a percentage of the total duration) the tag scan window could self-terminate. This would help conserve battery power in the event that an animal triggered the reader while it was passing by, but did not actually visit the monitored area. Tag scan windows also contain context information such as the ID of the reader, which can be used (e.g., by a remote server system) to match it to a corresponding database, or to appropriately contextualize and enrich the data received.

Inside a tag scan window, there may be a tag scan period for each detected tag. Tag scan periods have a timeout time so that if a tag leaves for that time and comes back, a new tag scan period for that tag begins. Tag scan periods have a start time, end time, and (potentially) the best RSSI value. Multiple tag scan periods for the same tag can be recorded in the same tag scan window.

Tag scan periods are meant to be discrete visits by an animal within a tag scan window, allowing for flexible tag scan windows. In one aspect, the tag scan periods assist in adjusting tag scan windows since it is not known how long the optimal tag scan duration is. Moreover, the tag scan window may need to be adjusted over time (winter versus spring, day versus night, etc.) and location (e.g., water trough versus feed trough versus shelter). Additionally, tag scan periods can provide for fine analysis of animal movements that may not be picked up by a tag scan period.

When evaluating multiple tag scan periods (possibly on a remote server system), the total of all the tag scan periods in a tag scan window can be added together. If the total compiled scan time of the RFID tag is not greater than a portion (e.g., 25-50%) of the tag scan window, then that tag entry is pruned.

In particular implementations, an RF reader system may have multiple ways with which to communicate with a remote computer system. For example, an RF reader system may have WiFi, cellular, and/or satellite capabilities. If multiple communication modes are available, an RF reader system can make a decision regarding which communication mode to use. For example, if an RF reader system is a designated communicator in a UAM or AAM, it may preferentially choose to use WiFi, cellular, and then satellite communication modes. Additionally, in a mesh situation, the RF reader systems in the mesh may choose to use an RF reader system that has a preferred communication mode (e.g., WiFi) as a designated communicator versus an RF reader system that do not.

Figure 6:
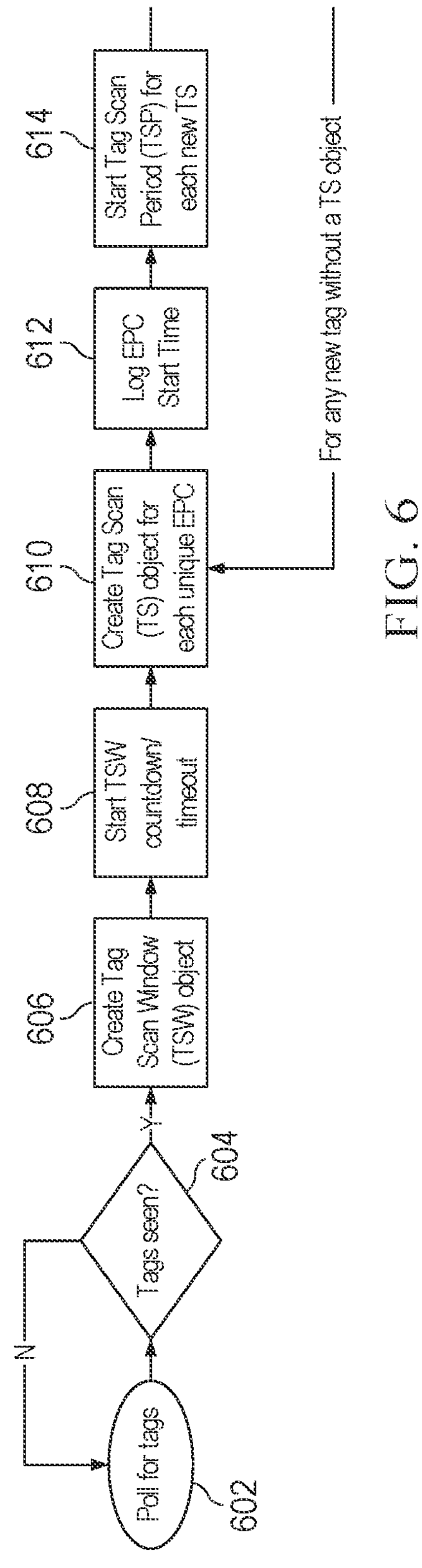
FIG. 6 is a flowchart illustrating selected operations of an additional example process for animal management.
Figure 6:
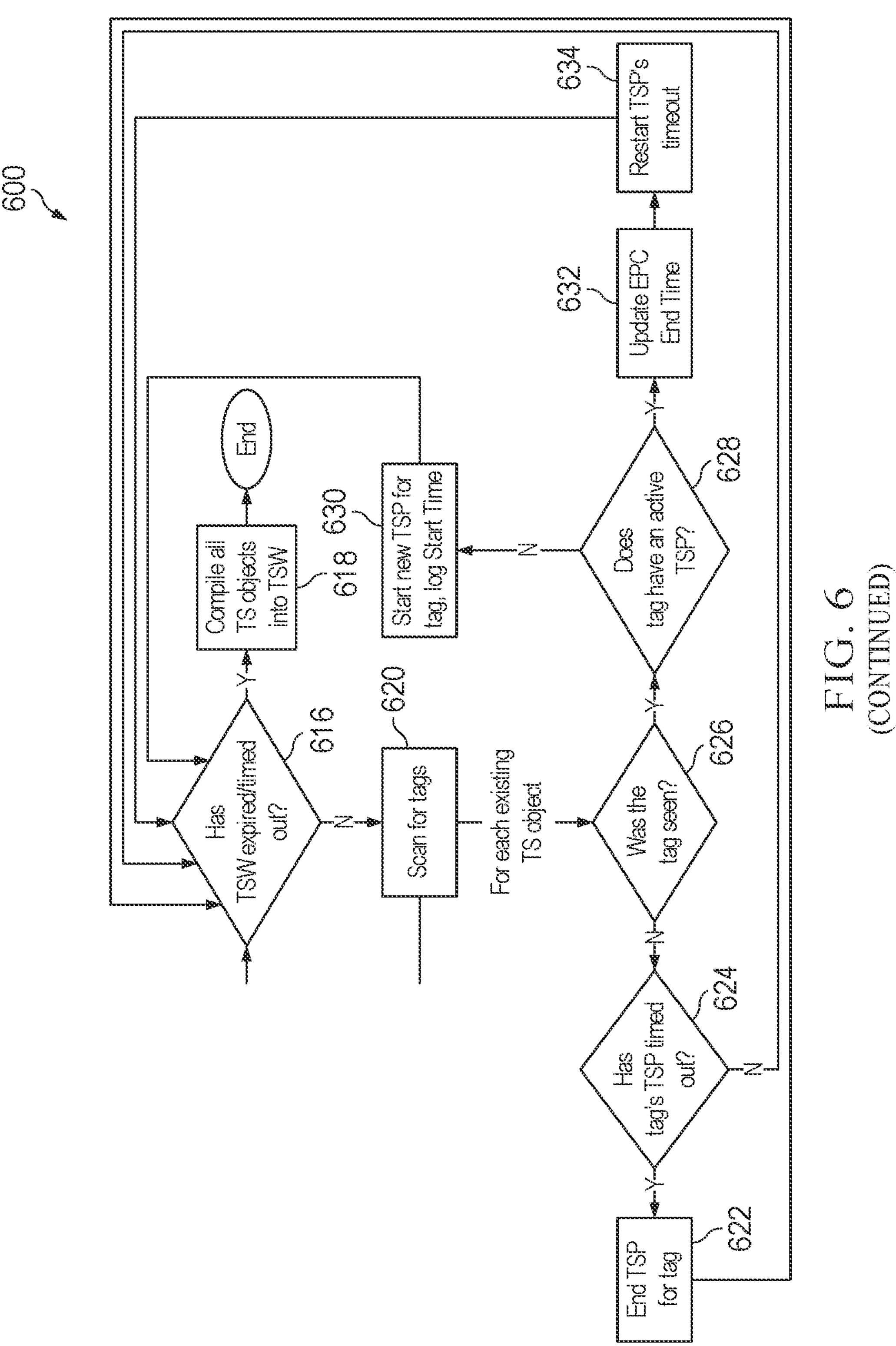

FIG. 6 illustrates an example process 600 for an animal management system. Process 600 may, for example, be executed by an RF reader system 410.

Process 600 calls for scanning for RFID tags (operation 602). Scanning for tags may, for example, be accomplished at a regular interval (e.g., 10 s), which could vary (e.g., depending on the time of day). Process 600 also calls for determining whether any RFID tags were detected (operation 604). If no RFID tags were detected, process 600 calls for again scanning for RFID tags (operation 602).

If, however, an RFID tag was detected, process 600 calls for creating a tag scan window object (operation 606) and starting a tag scan window countdown (operation 608). The tag scan window object allows for the storing of data for the tag scan window. Process 600 also calls for creating a tag scan object for each unique RFID tag detected (operation 610), logging the start time for each detected RFID tag (operation 612), and starting the tag scan period for each detected RFID tag (operation 614).

Process continues with determining whether the tag scan window has expired (operation 616). If the tag scan window has expired, process 600 calls for compiling all the tag scan objects in the tag scan window (operation 618). Process 600 is then at an end.

If, however, the tag scan window has not expired, process 600 calls for scanning for RFID tags (operation 620). If a new RFID tag is detected, process 600 calls for creating a tag scan object for that RFID tag (operation 610), logging the start time for the newly detected RFID tag (operation 612), and starting a tag scan period for the newly detected RFID tag (operation 614).

For each existing tag scan object during a scan, process 600 calls for determining whether the RFID tag was detected (operation 622). If the RFID tag was not detected, process 600 calls for determining whether the RFID tag's tag scan period has expired (operation 624). If the tag scan period for the RFID tag has not expired, then the processing for that tag has ended for that scan. If, however, the tag scan period for the RFID tag has expired, process 600 calls for ending the tag scan period for that RFID tag (operation 626). The processing for that RFID tag is that at an end for the current tag scan window unless the RFID tag reappears.

On the hand, for existing tag scan objects having a detected RFID tag, process 600 calls for determining whether the RFID tag has an active tag scan period (operation 628). If an RFID tag does not have an active tag scan period, process 600 calls for starting a new tag scan period for the RFID tag and logging the start time (operation 630). The processing for that tag has ended for that scan. If, however, an RFID tag does have an active tag scan period, process 600 calls for updating the end time for the scan period for the RFID tag (operation 632) and restarting the tag scan period timeout for the RFID tag (operation 634). Once all of the RFID tags having an active tag scan object have been processed for a scan, process 600 calls for again determining whether the tag scan window has expired (operation 616).

In some implementations, an RF reader system in a separate area may need to send its data to another RF reader system for communication to another network (e.g., cellular or Internet). The RF reader system acting as the gateway may be a single RF reader system or part of a mesh (e.g., a UAM). For example, an RF reader system covering a water trough may interact with a UAM covering a feed bunk, an example of which is illustrated in FIG. 4. Thus, an aggregate area mesh (AAM) may be formed. Note that there can be holes in coverage in an AAM.

Figure 7:
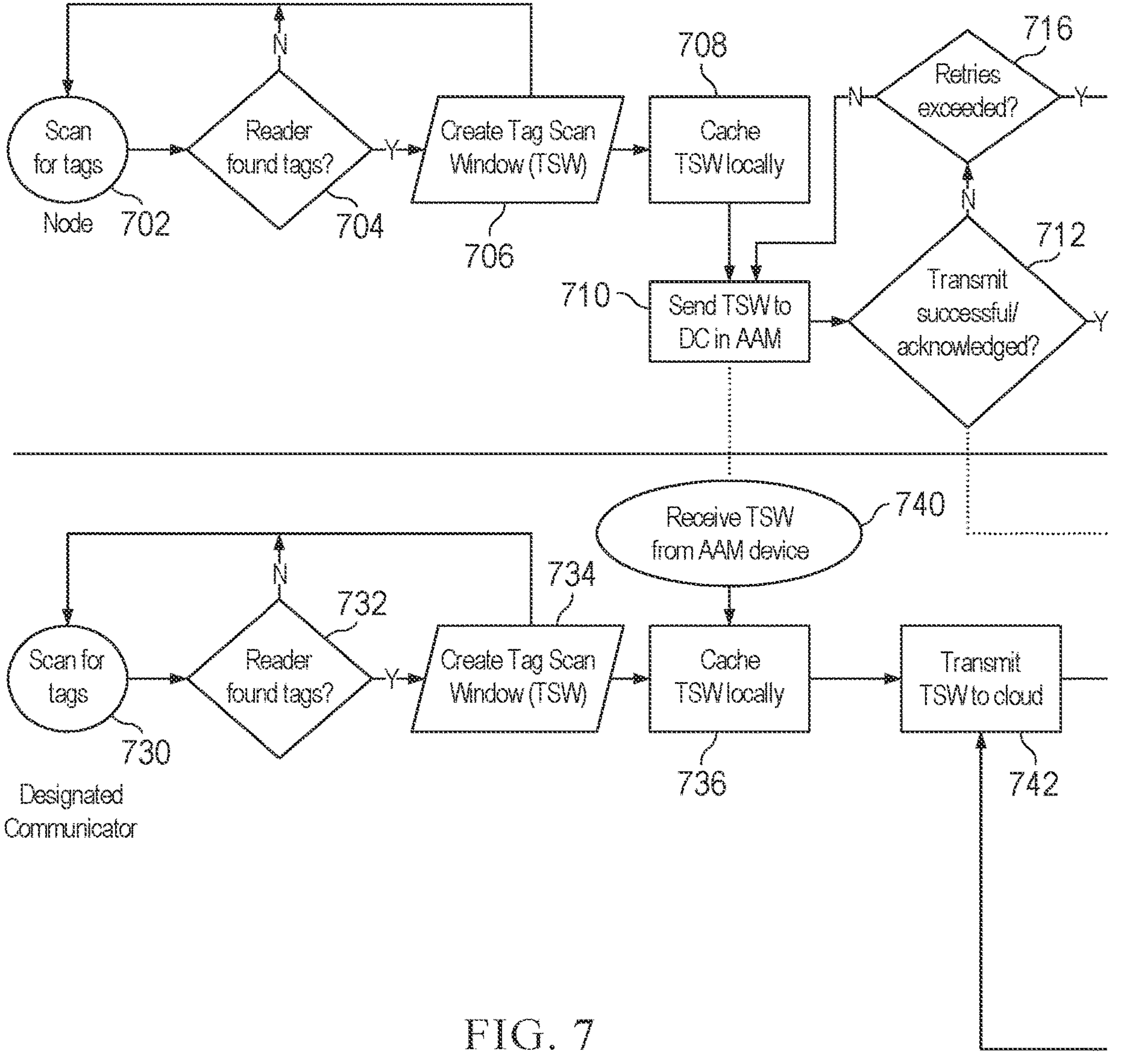
FIG. 7 is a flowchart illustrating selected operations of another example process for animal management.
Figure 7:
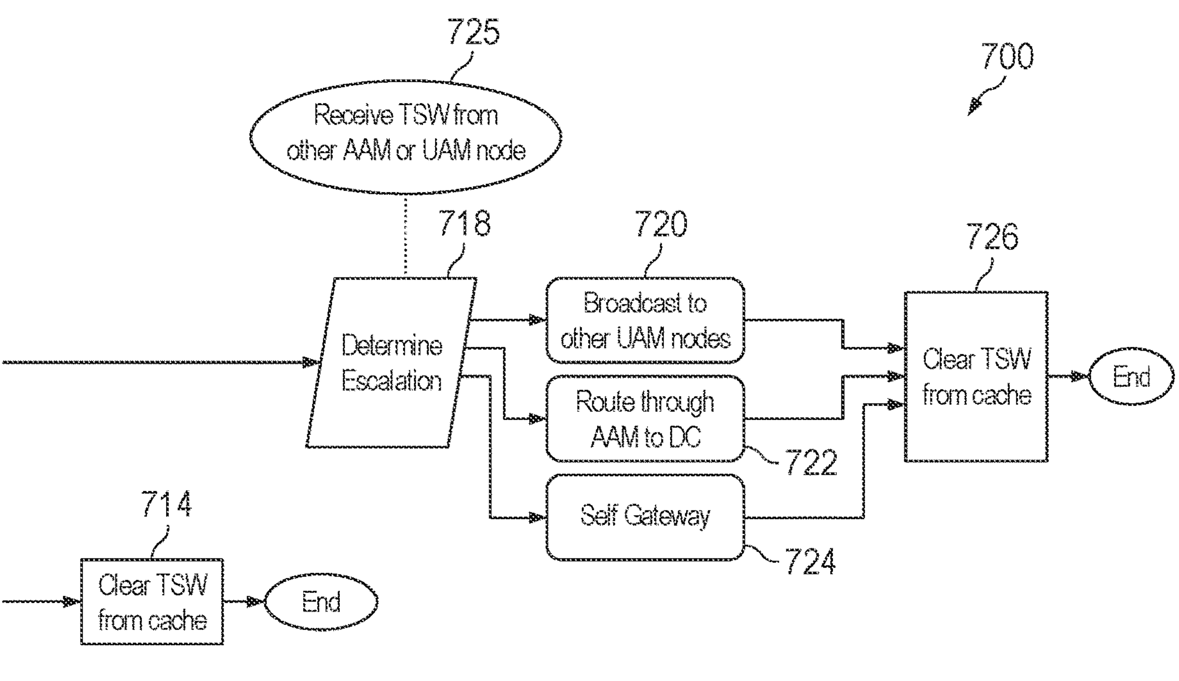
Figure 7:
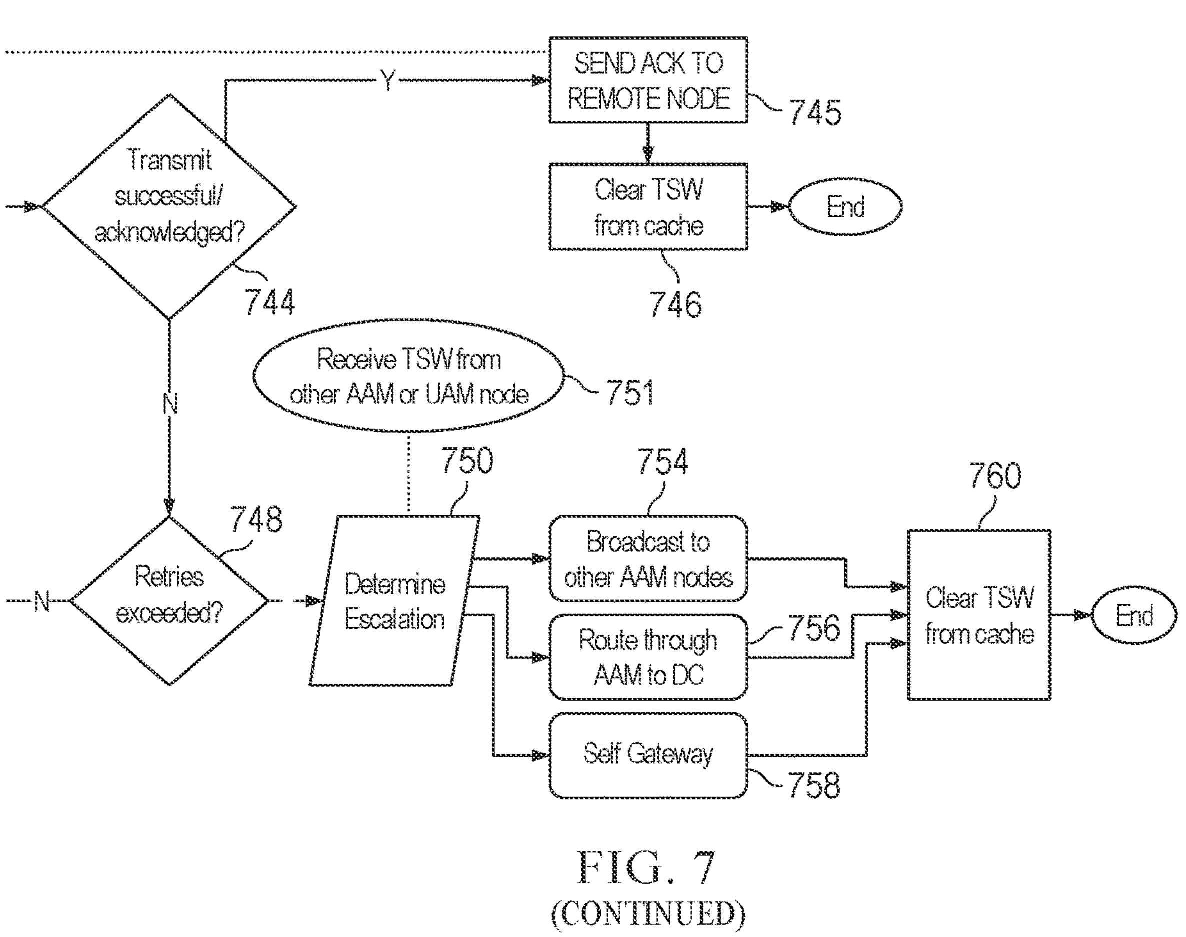

FIG. 7 illustrates selected operations of an example process 700 for an animal management system implementing an AAM. Process 700 calls for scanning for tags at a singular RF reader system (operation 702). The scanning may, for example, be accomplished on a regular basis (e.g., every 15 s). Process 700 also calls for determining whether any RFID tags were detected during a scan (operation 704). If no RFID tags were detected, process 700 again calls for scanning for RFID tags (at the designated time).

Once an RFID tag is detected, process 700 calls for generating a tag scan window for the singular RF reader system (operation 706). As noted previously, a tag scan window is basically a period in which the detecting RF reader system will scan for RFID tag on a more frequent basis (e.g., 0.5 Hz). Process 700 then calls for continuing to scan for tags in the tag scan window.

Once the tag scan window is complete, process 700 calls for caching the tag scan window locally (operation 708) and sending the tag scan window to the RF reader system acting as the designated communicator for the AAM (operation 710). Process 700 then calls for the singular node to wait to receive an acknowledgment that the tag scan window was processed by the designated communicator (operation 712).

If the tag scan window was successfully processed by the designated communicator, the tag scan window is cleared from the local cache (operation 714), and process 700 is at an end for that tag scan window. The singular RF reader system would typically return to operation 702.

If, however, no acknowledgement is received from the designated communicator, process 700 calls for determining whether the number of send attempts has been exceeded (operation 716). If the number of send attempts has not been exceeded, process 700 calls for again sending the tag scan window to the designated communicator (operation 710).

If, however, the number of send attempts has been exceeded, process 700 calls for escalating the sending of the tag scan window (operation 718), along with any other tag scan windows received from other nodes in the AAM (operation 725). For example, the RF reader system could try broadcasting the tag scan window to other nodes in the AAM (operation 720), routing the tag scan window through the AAM to the designated communicator (operation 722), or becoming a gateway and routing the tag scan window to a remote host (e.g., a server system) (operation 724). In particular, implementations, the RF reader system may pick one of these operations or try them in succession until a successful transmission of the tag scan window is complete. Once the tag scan window has been transmitted successfully, process 700 calls for clearing the tag scan window from cache (operation 726), and process 700 is at an end for that tag scan window. The singular RF reader system would typically return to operation 702.

Process 700 also calls for the designated communicator to be scanning for tags contemporaneously with the other RF readers in the AAM (operation 730). Process 700 calls for determining whether any RFID tags were detected by the designated communicator during a scan (operation 732). If no RFID tags were detected by the designated communicator, process 700 again calls for scanning for RFID tags (operation 730).

Once RFID tags are detected during a scan, process 700 calls for generating a tag scan window (operation 734). Process 700 then calls for continuing to scan for tags in the tag scan window. During these operations, the designated communicator may also be receiving tag scan windows from other RF reader system in the UAM (operation 740).

Once the tag scan window is complete at the designated communicator, the tag scan window is cached locally on the designated communicator (operation 736), and the designated communicator transmits the tag scan windows to a remote host (operation 742). If a tag scan window is not generated by the designated communicator in a time close enough to a received tag scan window, the received tag scan window can be transmitted without a tag scan window from the designated communicator.

Process 700 also calls for determining whether the transmission of the tag scan window(s) was successful (operation 744). If the transmission of the tag scan window from another RF reader system was successful, process 700 calls for sending an acknowledgment to the other RF reader system (operation 745) and clearing the local cache of the tag scan window (operation 746). Process 700 is then at an end for that tag scan window. The designated communicator would typically return to operation 730.

If the transmission to the remote host is not successful, process 700 calls for determining whether the number of send attempts has been exceeded (operation 748). If the number of send attempts has not been exceeded, process 700 calls for again sending the tag scan window to the remote host (operation 742).

If, however, the number of send attempts has been exceeded, process 700 calls for escalating the sending of the tag scan window (operation 750), along with any other tag scan windows received from other nodes in the AAM (operation 751). For example, the RF reader system could try broadcasting the tag scan window to other AAM modes (operation 754), routing the tag scan window through the AAM to another designated communicator (operation 756), or becoming a gateway and routing the tag scan window to the remote host (operation 758). Often, a designated communicator may already be a gateway, but in situations where it is not, operation 758 may be implemented.

In particular, implementations, the RF reader system may pick one of these operations or try them in succession until a successful transmission of the tag scan window is complete. Once the tag scan window has been transmitted successfully, the tag scan window is cleared from cache (operation 760), process 700 is at an end for that tag scan window. The designated communicator would typically return to operation 730.

The distinction between UAMs and the larger AAM can be accomplished a few different ways. UAMs could, for example, leverage a completely separate mesh radio, such as Zigbee or Sigfox. Communications among the larger AAM could leverage radios like BLE or LoRa. A designated communicator node may have both radios enabled, but other nodes would only need one.

Another way to accomplish UAMs inside of an AAM is by subnetting or routing a single mesh radio. Creating a subnet for each AAM, which is possible in topologies such as BLE, would help limit and direct traffic inside the UAM and AAM. Conversely, with a radio like Zigbee, readers could be configured to know the IDs of the other readers in its UAM and route specifically to these nodes instead of multicasting to any listening reader.

It is possible that the "multi mesh" strategy can be accomplished with just one radio. BLE Mesh, for example, is capable of having multiple "subnets" if a device has more than one NetKey. This provides a way to have the overall network and smaller "sub" meshes for specific areas. If a feed bunk inside of pen takes multiple readers to effectively cover it, for example, those readers can each have an additional identical NetKey, thereby creating a miniature network for themselves.

BLE uses controlled flooding, where all messages get passed along, but they are not really "read" unless that node is subscribed to that topic. Topics can be a unicast address (to a specific reader), a group address, or a custom human readable address. Human readable addresses can be programmatically assigned to zones in the possible event that group addresses are controlled by the Bluetooth Special Interest Group.

On the other hand, Zigbee and some other meshes (B.A.T-.M.A.N, Sig Fox, LoRa, etc.) use routing systems, where the network can figure out direct relationships between nodes, and then each node has a routing table they use to forward information to a specific device. Routing makes sense as the "subnetwork" structure, as devices will generally be communicating with known devices, and won't need to broadcast messages.

Flooding, however, makes sense for large scale coordination of the network. For example, flooding allows distribution of configuration updates to all or applicable nodes. Additionally, flooding allows broadcast transmission requests to devices that are listening for them, ensuring that data is transmitted if a device is having issues with its own network connectivity.

Figure 8:
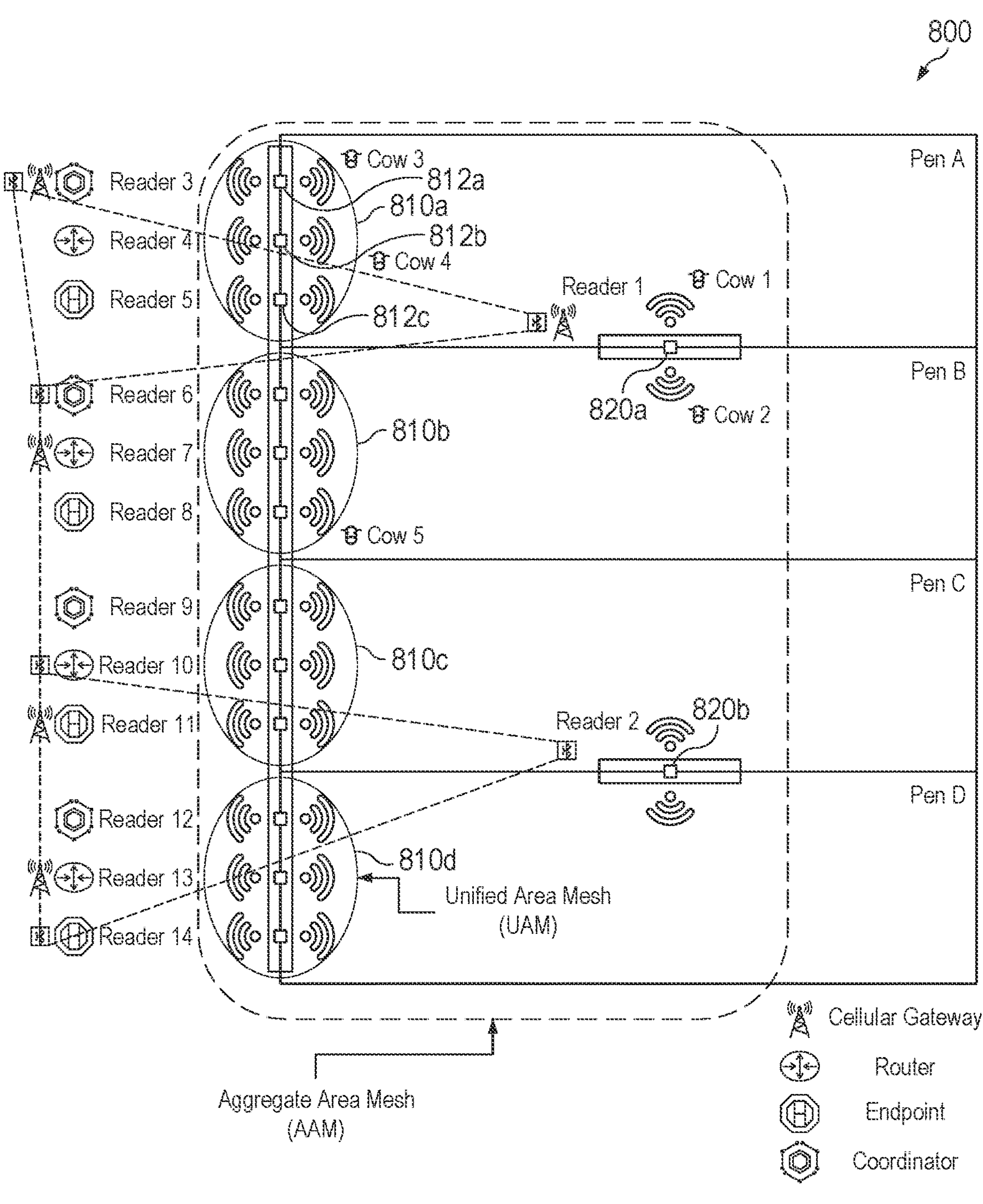
FIG. 8 is a line drawing illustrating selected components of an example animal management system.

FIG. 8 illustrates another example system 800 for animal management. In particular, system 800 illustrates an AAM. At a simple level, an AAM is composed of RF reader systems in two different coverage areas working together to provide coverage, although possibly imperfect, of a larger area. In system 800, there are four UAMs 810, each containing three RF reader systems 812), and two singular RF reader systems 820. As noted previously, each UAM 810 covers a designated area, but the singular RF reader systems 820 cover a different area. Each UAM 810 and singular RF reader system 820 could be an AAM, but together all the UAMs 810 and RF reader system 812 also form an AAM.

One of the simplest versions of an AAM occurs if one of the UAMs only has one RF reader system, which could happen if two of the RF reader systems in one of the illustrated UAMs went offline. Another example is if an individual RF reader system covered one area (e.g., a water trough) and another RF reader system covered another area (e.g., a shed). The operations of such configurations are illustrated by process 700.

In the operation of system 800, the RF reader systems are scanning for RFID tags, and will create a tag scan windows. As mentioned previously, tag scan windows provide a way of bundling tag reads together to consolidate data and reduce power consumption on the reader systems. When a tag scan window has completed, the RF reader system will operate differently depending on whether it is part of a UAM or not and whether it is a designated communicator or not.

RF reader systems in a UAM will send their tag scan windows to the designated communicator of their specific area mesh. The designated communicator waits to receive tag scan windows from other nodes in its area mesh so it can check for duplicated RFID tags across the tag scan windows it has generated and received. If the same RFID tag is found in multiple tag scan windows, the designated communicator will either decide which tag scan window is best to keep (e.g., based on duration, RSSI, etc.) or merge the windows together.

Once this deduplication is completed, the designated communicator will transmit the final tag scan window to the remote host if the designated communicator has an enabled network (e.g., cellular) module. This deduplication only happens to RF reader systems that are part of the same UAM, as other RF reader systems in the AAM should not have duplicate data.

RF reader systems that are independent of any UAMs 810, such as RF reader systems 820, will also be scanning for RFID tags and generating tag scan windows. Once an independent RF reader system generates a tag scan window, the reader system will check to see if it is a designated communicator and send the tag scan window to the designated communicator in the UAM if not.

In particular implementations, any RF reader system is capable of being a designated communicator, as they may all have internetwork capabilities (e.g., cellular modules), but only a select few RF reader systems will typically have them enabled at any time. If an RF reader system is unable to send its tag scan windows to a designated communicator or does not receive an acknowledgement of a successful transmission, it can temporarily activate its own gateway capabilities to send its own data.

In some implementations, an RF reader system may acts as a forwarder for devices other than RF reader systems. For example, an RF reader system may receive data from first or third party sensors to determine operational parameters at the facility (e.g., water consumption, rain amount, ambient temperature, humidity, etc.). A variety of IoT devices in the agricultural space (e.g., from RanchBOT) are suitable for this purpose. Communication with the IoT device could, for example, be accomplished wirelessly (e.g., via Bluetooth, BLE, LoRa, etc.) or by wireline (e.g., via Ethernet, RS-232, etc.).

Piggybacking the data from the IoT devices allows the RF reader systems to optimize their own performance. For example, the data could help indicate which of the readers have better environmental conditions, which would make adjusting roles (e.g., designated communicator, router, end point) easier.

Figure 9:
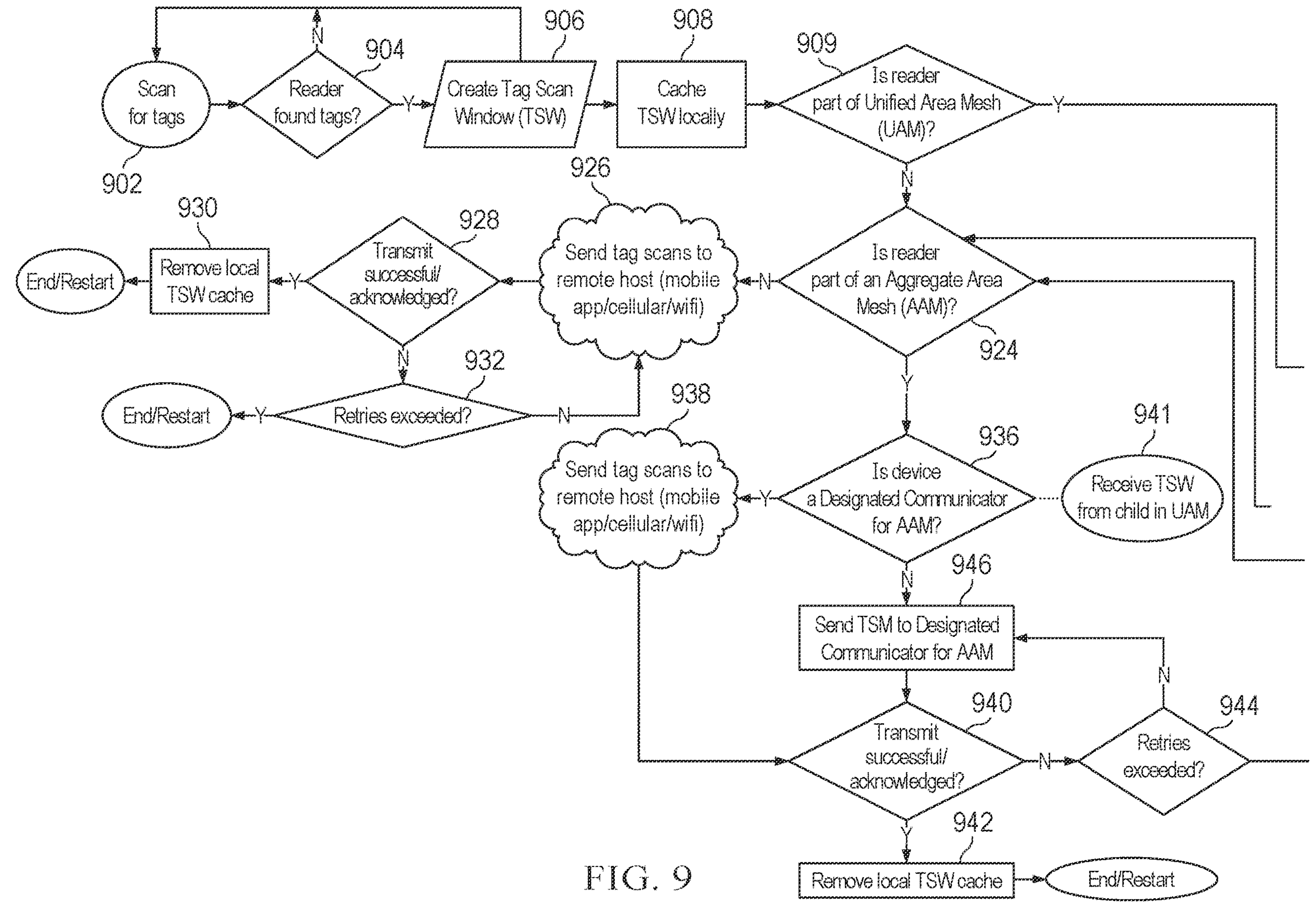
FIG. 9 is a flowchart illustrating selected operations of an example process for animal management.
Figure 9:
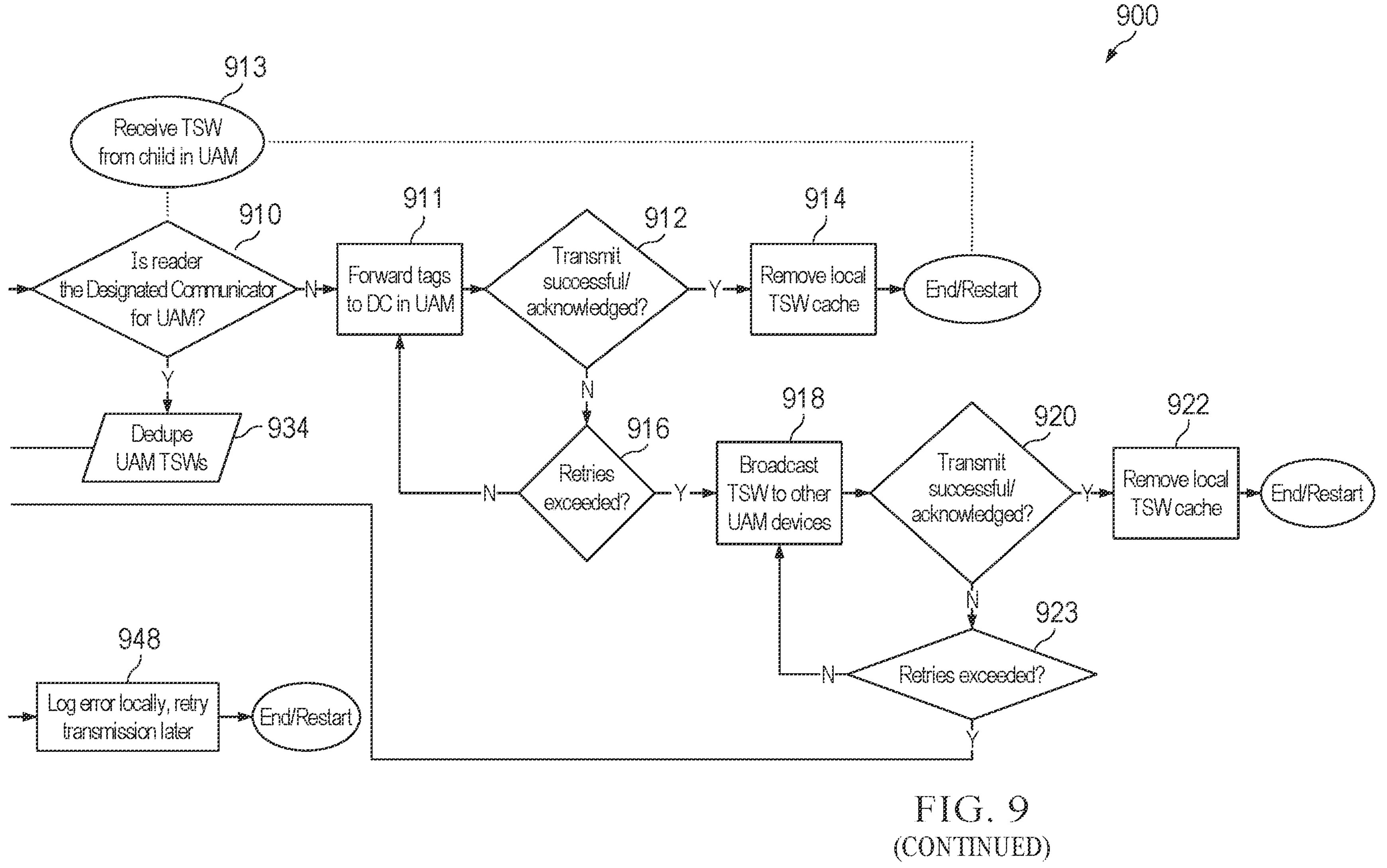

FIG. 9 illustrates an example process 900 for animal management. Process 900 may, for example, be implemented by a system similar to system 800.

Process 900 calls for scanning for RFID tags at an RF reader system (operation 902). The scanning may, for example, be accomplished on a regular basis (e.g., every 10 s). Process 900 also calls for determining whether any RFID tags were detected during a scan (operation 904). If no RFID tags were detected, process 900 again calls for scanning for RFID tags (at the designated time).

Once an RFID tag is detected, process 900 calls for generating a tag scan window for the RF reader system (operation 906). A tag scan window is basically a period in which the detecting RF reader system will scan for RFID tag on a more frequent basis (e.g., 1 Hz). Once an RFID tag is detected, frequent scans will provide data about an animal (e.g., how long it stayed in the particular area). Process 900 then calls for continuing to scan for tags in the tag scan window.

Once the tag scan window is complete, process 900 calls for caching the tag scan window locally (operation 908) and determining whether the RF reader system is part of a UAM (operation 909). If the RF reader system is part of a UAM, process 900 calls for determining whether the RF reader system is a designated communicator for the UAM (operation 910).

If the RF reader system is not the designated communicator, process 900 calls for sending the tag scan window and any tag scan windows received (operation 913) to the designated communicator for the UAM (operation 911). Process 900 then calls for waiting to receive an acknowledgment that the tag scan window(s) were processed by the designated communicator (operation 912).

If the tag scan window was successfully processed by the designated communicator, the tag scan window is cleared from the cache (operation 914), and process 900 is at an end for that tag scan window. The RF reader system would typically return to operation 902, although it may already have started another tag scan window in certain instances, such as detecting a new RFID while waiting for confirmation.

If no acknowledgement is received from the designated communicator, process 900 calls for determining whether the number of send attempts has been exceeded (operation 916). If the number of send attempts has not been exceeded, process 900 calls for again sending the tag scan window to the designated communicator (operation 911).

If, however, the number of send attempts have been exceeded, process 900 calls for broadcasting the tag scan window to other UAM systems (operation 918) and again checking whether the transmission was acknowledged (operation 920). The other UAM systems could route the tag scan window to a designated communicator for the UAM, and the acknowledgement would typically come from the designated communicator, possibly via the nodes that received the broadcast message. If the transmission is acknowledged, process 900 call for clearing the tag scan window from the cache (operation 922), and process 900 is at an end for that tag scan window. The node RF reader system would typically return to operation 902.

If no acknowledgement is received, process 900 calls for determining whether the number of send attempts has been exceeded (operation 922). If the number of send attempts has not been exceeded, process 900 calls for again broadcasting the tag scan window to other UAM systems (operation 918).

If the number of send attempts has been exceeded, process 900 calls for determining whether the RF reader system is part of an AAM (operation 924). If the RF reader system is not part of an AAM, process 900 calls for attempting to send the tag scan window to a remote host using the RF reader system's internetworking capabilities (operation 926). Process 900 also calls for determining whether the transmission was acknowledged (operation 928). If the transmission was acknowledged, process 900 calls for removing the tag scan window from local cache (operation 930), and process 900 is at an end for that tag scan window. The node RF reader system would typically return to operation 902.

If no acknowledgement is received, process 900 calls for determining whether the number of send attempts has been exceeded (operation 932). If the number of send attempts has not been exceeded, process 900 calls for again sending the tag scan window to a remote host using the RF reader systems internetworking capabilities (operation 928). If, however, the number of sending attempts has been exceeded, process 900 calls for is at an end for that tag scan window. The tag scan window can be stored and transmitted to the remote host at a later time (e.g., hours or days later). The node RF reader system would typically return to operation 902.

If, however, the RF reader system is part of an AAM, process 900 calls for attempting to send the tag scan window using the AAM (operation 936). Sending the tag scan window using an AAM will be discussed later below.

Returning to operation 910, if the RF reader system is a designated communicator for the UAM, process 900 calls for deduping the tag scan window and any tag scan windows received from other RF reader systems (operation 913) in the UAM (operation 934). Process 900 also calls for determining whether the RF reader system is part of an AAM (operation 924). If the RF reader system is not part of an AAM, the RF reader system attempts to send the tag scan window to the remote host (operation 926).

If the RF reader system is part of an AAM, process 900 calls for determining whether the RF reader system is the designated communicator for the AAM (operation 936). If the RF reader system is the designated communicator for the AAM, process 900 calls for sending the tag scan window and any other tag scan windows received from other AAM devices (operation 941) to the remote host (operation 938).

Process 900 also calls for determining whether the transmission was successful (operation 940). If the transmission was successful, process 900 calls for removing the tag scan window(s) from the local cache (operation 942), and process 900 is at an end for that tag scan window. The node RF reader system would typically return to operation 902.

If, however, the transmission was not successful, process 900 calls for determining if the number of retries has been exceeded (operation 944). If the number of retries has not been exceed, process 900 calls for sending the tag scan window(s) to another designated communicator for the AAM (operation 946) and checking whether that transmission was successful (operation 940).

If, however, the number of retries has been exceeded, process 900 calls for logging an error locally and retrying the transmission later (operation 948). Process 900 is at an end for that tag scan window. The node RF reader system would typically return to operation 902.

Returning to operation 909, if the RF reader system is not part of a UAM, process 900 calls for determining whether the reader is part of an AAM (operation 924). If the RF reader system is not part of an AAM, process 900 calls for attempting to send the tag scan windows to the remote host (operation 926). If, however, the RF reader system is part of an AAM, process 900 calls for determining whether the RF reader system is a designated communicator for an AAM (operation 936) and attempting to send the tag scan window to the remote host (operation 938) if it is or sending the tag scan window to a designated communicator of the AAM (operation 946) if it is not.

Process 900 have a variety of features. For example, an RF reader system can determine what type of mesh it is in, if any, and send a tag scan window via the appropriate designated communicator for that mesh. Additionally, process 900 allows an RF reader system to change from being an endpoint to a gateway if needed.

Figure 10:
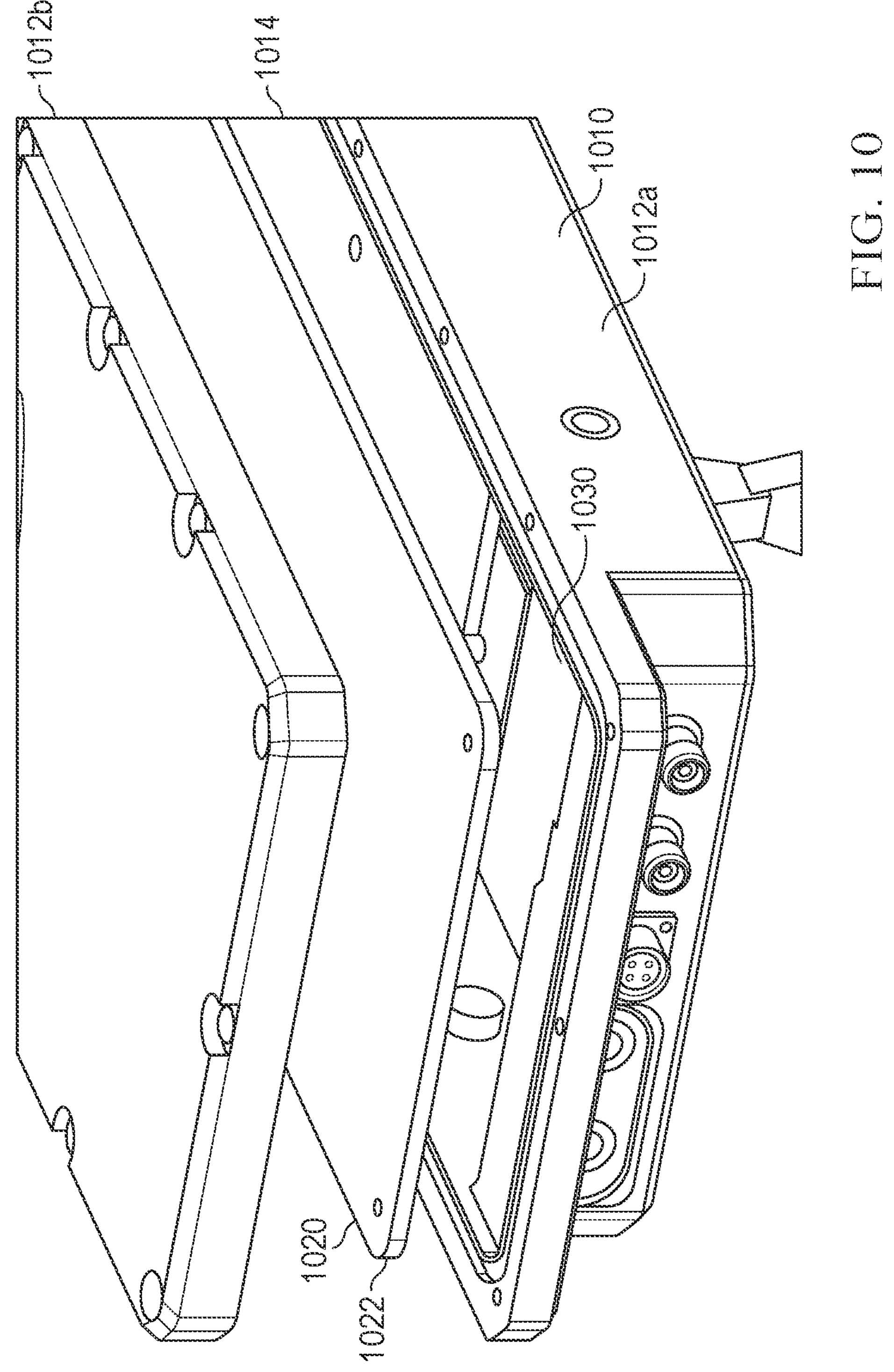
FIG. 10 is a line drawing illustrating selected components of an example RF reader system for animal management.

FIG. 10 illustrates an example RF reader system 1000. Among other things, RF reader system 1000 includes a housing 1010 inside of which sits an antenna 1020 and a printed circuit board ("PCB") 1030.

In the illustrated implementations, housing 1010 includes two parts 1012. Part 1012*a* houses the PCB 1030 and provides a plastic divider 1014 for antenna 1020 to rest on. The antenna 120 may, for example rest in a route in a route in part 1012*a* such that its top is flush with the top of parts 1012*a*. Part 1012*b* is then attached (e.g., screwed) to part 1012*a* to clamp antenna 1020 in place. Part 1012*b* may be configured to leave an air gap between the radiating face of the antenna 1020 and the back of the part 1012*b*. Parts 1012 may be made from plastic (e.g., Delrin) or any other appropriate material.

Housing 1010 may have a compact form factor. For example, housing 1010 may have a ratio of about 9×3×1 in length×depth×height. In particular implementations, housing 1010 may be about 400-500 mm long, 100-200 mm deep, and 25-75 mm high.

In the illustrated implementation, antenna 1020 is encapsulated by housing 1010. In general, antenna 1020 may be a dipole antenna, a loop antenna, a patch antenna, or any other appropriate type of antenna. In the illustrated embodiment, antenna 1020 is a patch antenna having a ground plane 1022. Ground plane 1022 is mounted facing printed circuit board 1030. Antenna 1020 may have a spherical or directional beam.

Most RFID antennas create spherical read zones, where the cross section is circular. However, in many applications involving animals, the majority of areas are elongated rectangles. A traditional antenna in these cases would tend to sense tags that are further away than the area of interest. Thus, antenna 1020 may have an elliptical "fan-beam" radiation pattern to mitigate the risk of introducing false positive RFID tag scans.

Printed circuit board 1030 holds the controller for RF reader system 1000. The control can include a processing unit, memory, and a communication interface—WiFi, Bluetooth, cellular (e.g., TDMA or CDMA), or otherwise.

The closeness of printed circuit board 1030, along with other radio emitters, with antenna 1020 has the potential to cause interference/cross talk problems. Ensuring that the radios operated at different frequency ranges helps mitigate interference, and they are physically separated as much as possible on the PCB.

Users tend to desire simple installation and minimal equipment. This presents several challenges in creating a system that was intended be deployed in the elements with minimal support. Moreover, the two primary use cases—area monitoring and animal counting—have very different RFID scanning paradigms and priorities. To count animals, the RF reader system ought to be radiating nearly constantly and with high power to ensure that animals are not missed. Favorably, however, these sessions are typically initiated by the user and do not typically last longer than a few minutes, so power and network connectivity are typically not major concerns.

Conversely, to successfully monitor a larger area (e.g., in a ranching operation), the RF reader systems need to be on consistently scanning for RFID tags, and the read field needs to be precise enough to only capture RFID tags in its zone. There is also typically little to no networking or power infrastructure in the field, so the reader is expected to encompass these duties as well.

Additionally, the final unit needed to be compact, durable, and still have enough power to fulfill its purpose. Selecting lithium polymer battery types helped reduce the size needed to gain the necessary watt-hour capacity in a minimal footprint.

RF reader system 1000 may also include sensors inside the chassis, and inside of specific modules, to monitor the temperature of the system. In the event that items begin to overheat, the main operations of the system may be suspended to allow the unit to cool down.

In particular implementations, system 1000 may support a secondary antenna. The secondary antenna can be connected to the tag reader. The secondary antenna may, for example, connect to the main unit's tag reader through an external port on the primary unit case. A secondary antenna can allow expanding a read zone (such as a bunk), refining a read zone (long range animal approach and close range validation), or monitoring of a different zone (a trough further away). The antenna could also support a different beam pattern than the first (spherical, circular, or linear antennas, instead of circular fan-beam), or a different type (dipole, leaky coax, yagi) to further create or refine monitoring areas.

If the secondary antenna is used to merely expand a read zone, it may need to be deduped relatively to the primary antenna. For example, each antenna could get a tag scan window and then the tag scan windows could be duped by the RF reader system. Alternatively, the RF reader system could have one tag scan window and any reads by the antennas during a tag scan window can be deduped/merged during the tag scan window itself.

If the secondary antenna actually covers a different area, then no deduping is needed. The RF reader system could communicate the tag scan windows from both antennas as described above (e.g., as an endpoint, router, or gateway).

To power RF reader system 1000, batteries may be used in remote operations. RF reader system 1000 may also allow connection to standard power. Some areas in an animal operation may, for example, have access to mains AC electricity. These areas may include loading docks, veterinary areas, and barns. A reader used in these locations may then be able to draw power directly by using an AC/DC converter. In locations that have consistent power, these RF reader systems in a mesh could be more constant, provided they are near enough to unpowered nodes.

The cost to install electrical infrastructure across an entire ranching operation, however, would inhibit customers from adopting active technology. Pens and pastures are typically off-grid, and thus the readers need away to be charged off-grid. Using a trickle charge solar panel allows the readers to charge during low traffic times of the day, and mitigate power draw during higher-traffic times of day.

In particularly windy regions, such as the Texas panhandle or Kansas, users may find that using small wind turbines (traditional tri-rotor or helical) may provide more constant power than solar, especially if solar panels would get covered by constant dust spread by the windy conditions.

RF reader system 1000 is generally agnostic as to the source of its DC power. However, knowledge of the source can be implemented with simple hardware or additional software. For example, the input power pinouts could be connected differently for a renewable energy source (e.g., solar or wind) than for a constant power source. Being able to tell if the supply is constant (mains/charger) or alternative (e.g., solar or wind) would introduce some extra operations in converting between a reader and a gateway since it would be best to have the gateway nodes be supplied with constant power rather than alternative power, if possible.

In particular implementations, the processing unit that handles the charging circuit may also have analog-to-digital converters (ADCs) that can read the value of the incoming power and the level/status of the batteries. This information can be used to predict the system charge level, how efficiently power is being used relative to power generation, and impending power failures. A reader that is in a shady area, for example, will not charge as efficiently, and as such, may attempt to reduce its power consumption.

Mitigating power consumption can be done in a few different ways. For example, the processing unit may vary the frequency and duration that that tag reader is used—e.g., altering the duty cycle (% of time on vs. % of time off) and/or pulse width (e.g., to 200 ms). Additionally, the processing unit can reduce transmission rates (e.g., of messages to other devices, of system heartbeats, etc.). Furthermore, the processing unit may forward tag scans to a nearby mesh device instead of acting as a gateway itself. For instance, the processing unit may monitor solar panel voltage and current to determine if the system should be acting as a gateway or send scans through a mesh.

In particular implementations, an RF reader system may engage in selective shutdown. For example, the batteries' State of Charge (SoC) can be recorded and used to shut down the RF reader system if it is not charging quickly enough. With a processing unit monitoring the batteries and charging circuit separate from the main processing unit, it would be able to signal the main processing unit to suspend operations and go into a deep sleep if power is getting too low to sustain operations. This would allow for the RF reader system to charge while depleting minimal energy. Once an appropriate SoC is reached, the battery processing unit can re-awaken the main processing unit to resume normal operation.

In some implementations, power management of a fleet of RF reader systems (in a UAM, for example) is possible. With each RF reader system capable of keeping track of itself, this information can be used to optimize the health of the fleet of readers. Thus, an RF reader system that experiences a heavier load of animal visits, causing it to utilize its tag reader radio more extensively, can forward its tag information to a less active RF reader system for internetwork connectivity.

Moreover, in certain implementations, the battery status can be shared amongst RF reader systems by using heartbeat messages. RF reader systems experiencing lower or declining power can then offload some of their responsibilities (e.g., act as a router or a gateway) to other RF reader systems (e.g., those that have sufficient charge).

Additionally, animals tend to have set patterns they follow, especially if they are on regular feeding schedules. A fleet's power can be managed by alternating which units are enabled as gateways depending on the time of day. For instance, if animals are fed in the morning, then the readers monitoring a feed bunk would not use their cell modules during this time, and instead forward their messages to an RF reader system monitoring a water trough. Later in the day, when it is warmer and animals are thirsty, the RF reader system at the water trough may forward its data to the RF readers systems at the feed bunk, as animals will likely not be visiting the bunk.

Figure 11:
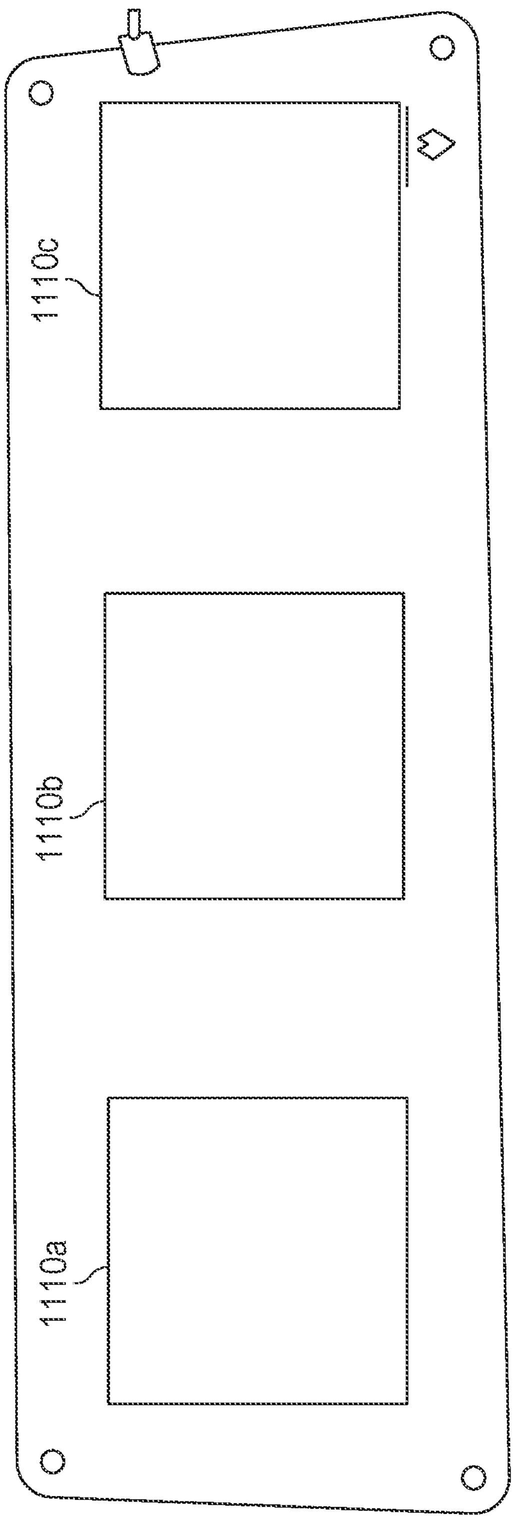
FIG. 11 is a line drawing illustrating an example antenna for an animal management system.

FIG. 11 illustrates an example antenna 1100 for an RF reader system. Antenna 1100 consists of three discrete radiating elements 1110 that are connected together through a common backplane. Antenna 1100 produces a fan beam (i.e., with different 3 dB beamwidths in azimuth and elevation). The ratio between the 3 dB beamwidths may, for example, be about 1.5, 2.0, 2.5, or 3.0. In particular implementations, antenna 110 may have a 3 dB beamwidth of approximately 90 degrees in elevation and 40 degrees in azimuth. Antenna 110 may, for example, be an Advantenna-p13 from Keonn Technologies S.L. of Barcelona, Catalonia (Spain).

Using a fan beam, see FIG. 4, for example, allows for more accurate detection for common animal areas, such as rectangular water troughs and elongated feed bunks. The elliptical shape reduces the possibility of scanning animals that are merely loitering near the area of interest, such as animals that are following the herd to water or feed, but not actually partaking. Fine tuning the antenna beam around an area can be accomplished by raising or lowering the antenna. An initial height estimate can be ascertained by taking half of the length of the area, and adding in any additional height considerations (e.g., trough height, mounting equipment).

Figure 12:
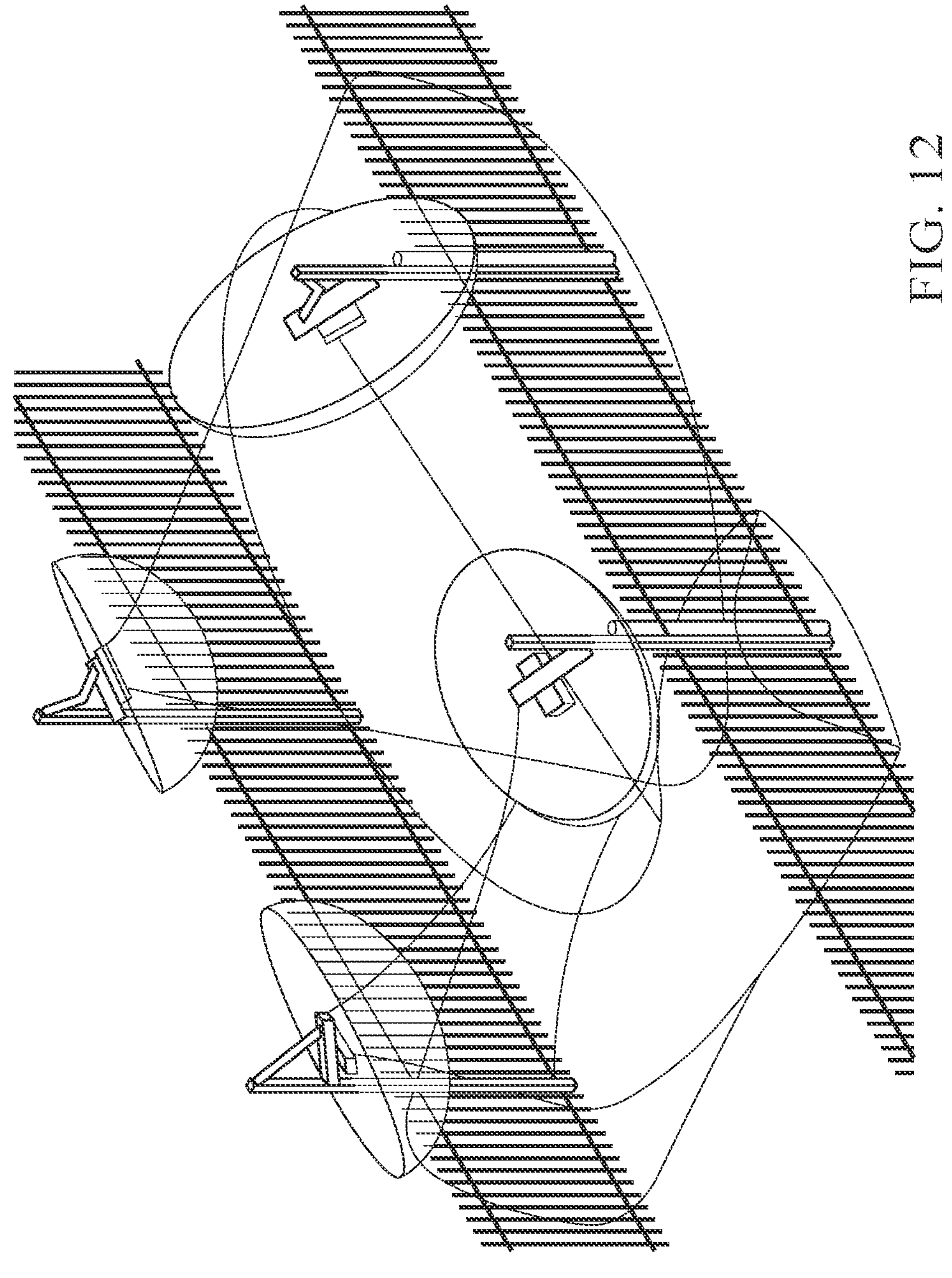
FIG. 12 is a line drawing illustrating an example system for animal management.

The shape of the fan beam antenna also provides unique advantages when attempting to count or detect animals passing through a threshold. By rotating the antenna, a user can either create a "longer" read zone, whereby animals spend a longer time in the read field and have a better chance of being scanned, or a narrow read zone that can be used to detect fewer animals. See FIG. 12. The longer read zone could be helpful when animals are getting loaded or unloaded, as they tend to clump together, which obscures opportunities for a tag to be scanned. Extending the read zone provides a wider area where an animal (or cluster of animals) is likely to get scanned.

Conversely, the narrow orientation would make it easier to isolate specific animals that are passing through a specific point. For example, if all of the animals are tagged, and they are getting passed into a squeeze chute for individual treatments, an antenna in this orientation would be better suited to scanning only the relevant animal and missing the animals behind it. Additionally, since the RF reader systems are capable of meshing (and have secondary antenna ports), it would also be possible to combine both orientations. This could be useful in detecting if animals have left a specific area (like transferring from one pen to the next, one pasture to the next, off of a loading dock, etc.) as it maximizes the read density and "tag time in read field" by providing more automation.

For example, animals first moving off of a truck tend to be more clustered together and slower moving. A mesh with these 4 readers (or two readers and two extra antennas) could detect the first slow moving animals with the narrow antennas, which could trigger the other readers or antennas to start scanning for animals. As more animals pass through the initial threshold, they will likely begin moving more quickly, which the "wide range" oriented antennas are more suited for, as the window of time the animal is in the read field is increased. A system like this could automatically trigger when the narrow antennas begin reading tags and still yield high accuracy.

In some implementations, an RF reader system could utilize a camera to better validate animal behavior. One difficulty with RFID techniques is inferring the behavior of the animal when it is in the read zone. Although RSSI is often used to estimate the proximity of RFID tags to RF reader systems, many factors affect the RSSI, such as tag orientation, tag cleanliness, RFID inlay integrity, degradation, etc. As such, it by itself cannot guarantee that an animal is behaving how it is expected to.

Integrating a camera with the RFID technology, however, allows an RFID tag to be identified electronically, and then visual monitoring may occur to validate if an animal has eaten food or drunk water. This enriches the quality of the data.

In operation, wide angle cameras can capture large areas, and the image can be projected via software onto a flat plane, making the video analysis—from a human or algorithm—simpler. But since both the tag reader and cameras consume large amounts of power, it is best to limit their unnecessary usage. As such, neither module should be on constantly. Instead, a modified tag scan window structure can be employed.

Both RFID detection and visual detection have their drawbacks, which may inhibit detection. RFID tags may degrade in performance over time, and are dependent on the condition of the tag and the environment. Cameras, on the other hand, are dependent on lens conditions and availability of light, and detection models can be thrown off if multiple animals are overlapping.

To compensate, varying the detection method that scans can help mitigate the risks associated with each detection method. A single image, for example, can be taken periodically and analyzed for animal presence. If there is an animal detected, then a tag scan window is created, and the tag reader activates to begin identifying RFID tags electronically. In the same way, the RFID reader system can pulse to find any tags, and if it finds a tag, it can activate the camera to begin visual counting and drinking/eating confirmations.

This dual detection method may also alert users if an animal has lost its RFID tag, since a camera could be able to identify a tagless animal. Additionally the dual detection method may help increase the accuracy of animal counting sessions, particularly if they are being loaded onto a truck. Machine learning models (e.g., TensorFlow, OpenCV, TinyML, etc.) can be very adept at capturing and counting instances of an object, and paired with electronic ID information provided by an RFID reader, would provide improved auditing and traceability in interoperational cattle transactions.

Figure 13:
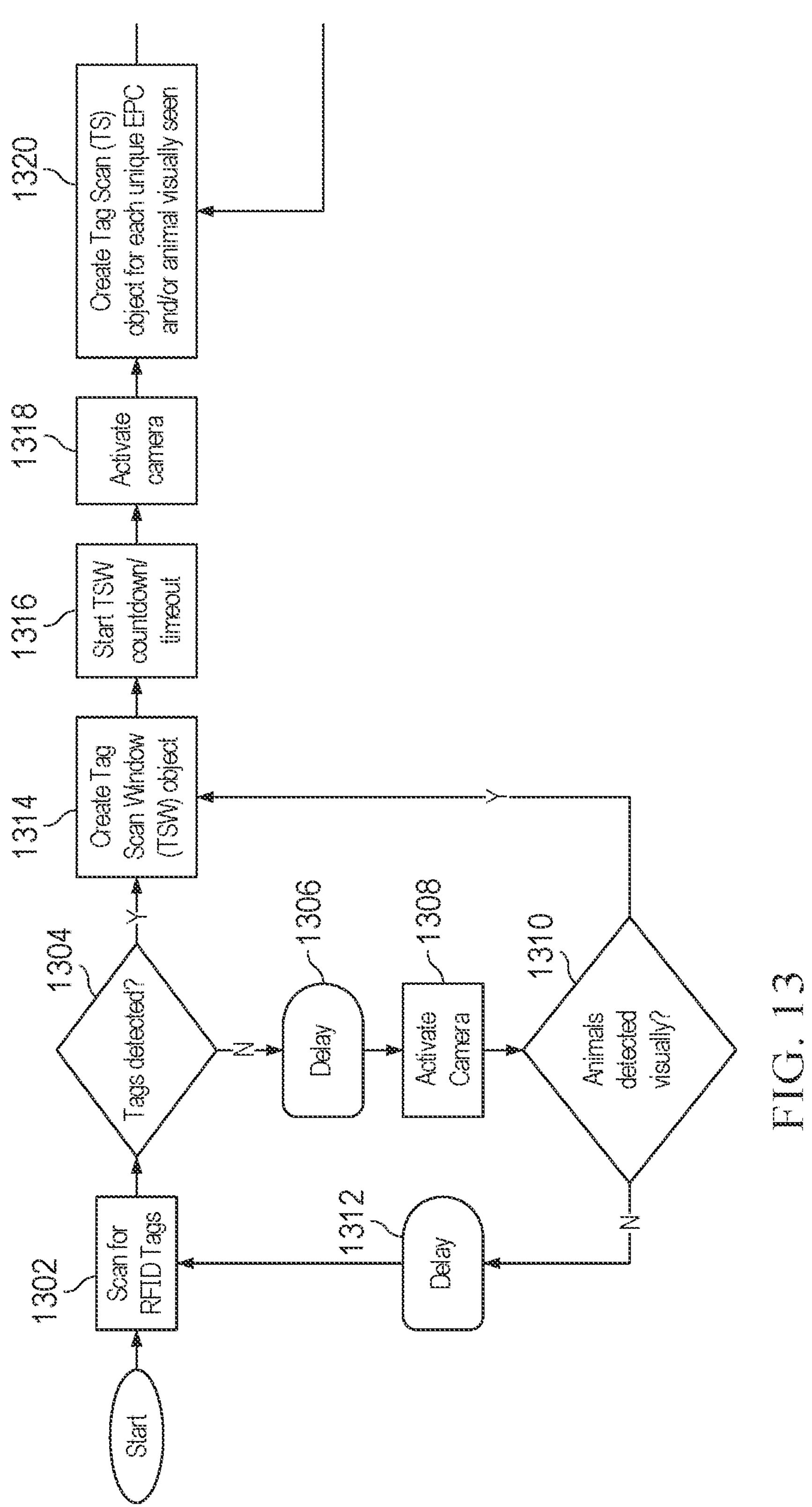
FIG. 13 is a flowchart illustrating selected operations of an example process for animal management.
Figure 13:
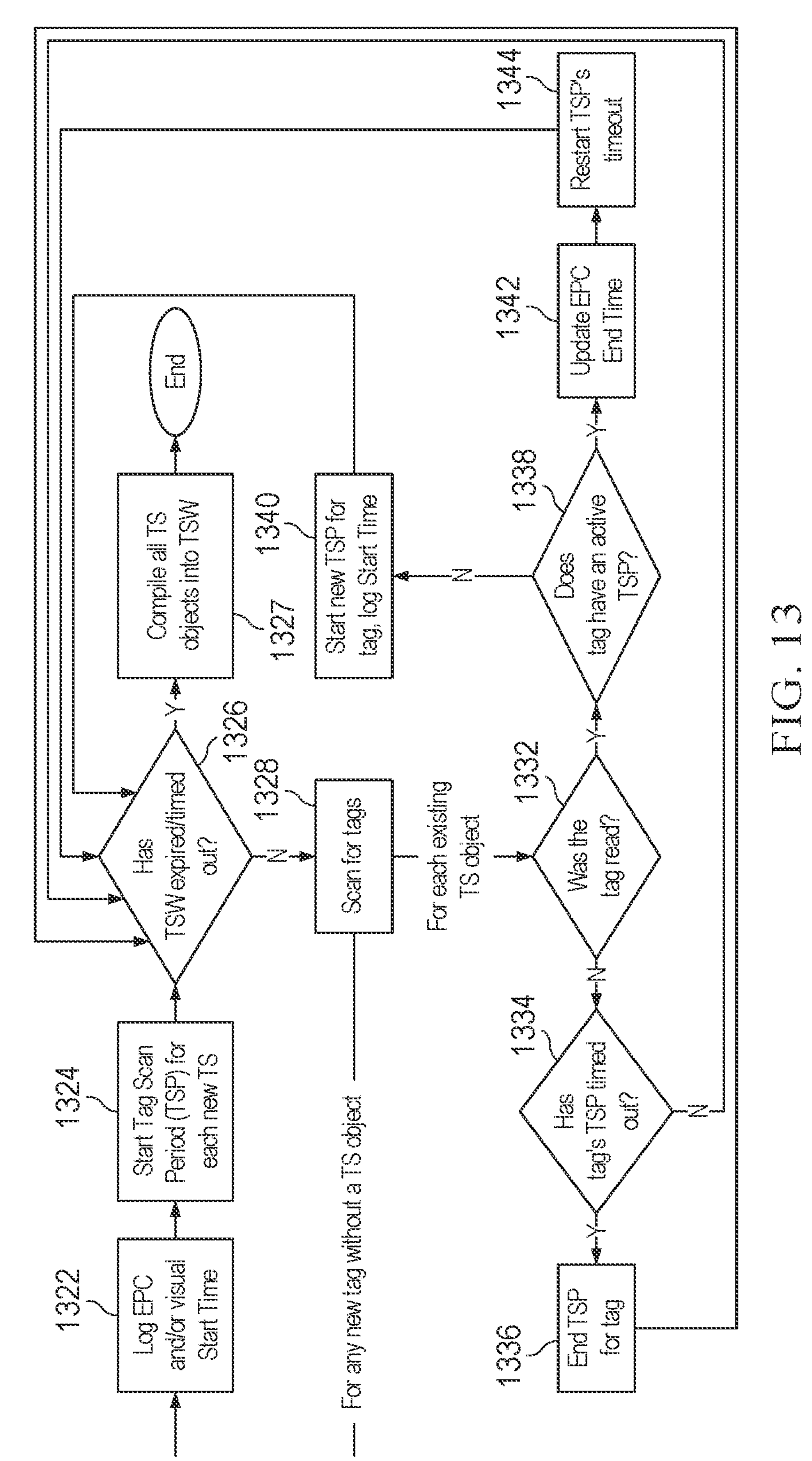

FIG. 13 illustrates another example process 1300 for an animal management system. Process 1300 may, for example, be accomplished by a RF reader system with an accompanying camera.

Process 1300 calls for scanning for RFID tags (operation 1302). Scanning for tags may, for example, be accomplished at a regular interval (e.g., 10 s), which could vary (e.g., depending on the time of day). Process 1300 also calls for determining whether any RFID tags were detected (operation 1304). If no RFID tags were detected, process 1300 calls for waiting (operation 1306) and collecting an image with the camera (operation 1308). Process 1300 then calls for determining whether any animals are present in the image (operation 1310). If no animals are present in the image, process 1300 calls for again waiting (operation 1312) and scanning for RFID tags (operation 1302).

If, however, RFID tags were detected or an animal was detected in an image, process 1300 calls for creating a tag scan window object (operation 1314) and starting a tag scan window countdown (operation 1316). The tag scan window object allows for the storing of data for the tag scan window. Process 1300 also calls for activating the camera (1318) to capture images of the area. Typically, images may be captured for the whole tag scan window, unless the tag scan window self-terminates due to inactivity (e.g., if an animal walks by but does not dwell in the area).

Process 1300 also calls for creating a tag scan object for each unique RFID tag detected (operation 1320), logging the start time for each detected RFID tag (operation 1322), and starting the tag scan period for each detected RFID tag (operation 1324). Process 1300 continues with determining whether the tag scan window has expired (operation 1326). If the tag scan window has expired, process 1300 calls for compiling all the tag scan objects into the tag scan window (operation 1327). Process 1300 is then at an end.

If, however, the tag scan window has not expired, process 1300 calls for scanning for RFID tags (operation 1328). If a new RFID tag is detected, process 1300 calls for creating a tag scan object for that RFID tag (operation 1320), logging the start time for the newly detected RFID tag (operation 1322), and starting the tag scan period for the newly detected RFID tag (operation 1324).

For each existing tag scan object, process 1300 calls for determining whether the associated RFID tag was detected (operation 1332). If the associated RFID tag was not detected, process 1300 calls for determining whether the RFID tag's tag scan period has expired (operation 1334). If the tag scan period for the RFID tag has not expired, then processing for that RFID tag has ended for that scan. If, however, the tag scan period for the RFID tag has expired, process 1300 calls for ending the tag scan period for that RFID tag (operation 1336). The processing for that RFID tag is that at an end for the current tag scan window unless the RFID tag reappears.

On the hand, for existing tag scan objects having a detected RFID tag, process 1300 calls for determining whether the RFID tag has an active tag scan period (operation 1338). If an RFID tag does not have an active tag scan period, process 1300 calls for starting a new tag scan period for the RFID tag and logging the start time (operation 1340). The processing for that tag has ended for that scan. If, however, an RFID tag does have an active tag scan window, process 1300 calls for updating the end time for the scan end time for the RFID tag (operation 1342) and restarting the tag scan period for the RFID tag (operation 1344).

Once all of the RFID tags having an active tag scan object have been processed for a scan, process 1300 calls for again determining whether the tag scan window has expired (operation 1320).

The flowcharts and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alterative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems that perform the specified function or acts, or combinations of special purpose hardware and computer instructions.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server system. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 14:
FIG. 14 is a block diagram illustrating selected components of an example computer system for animal management.
Figure 14:
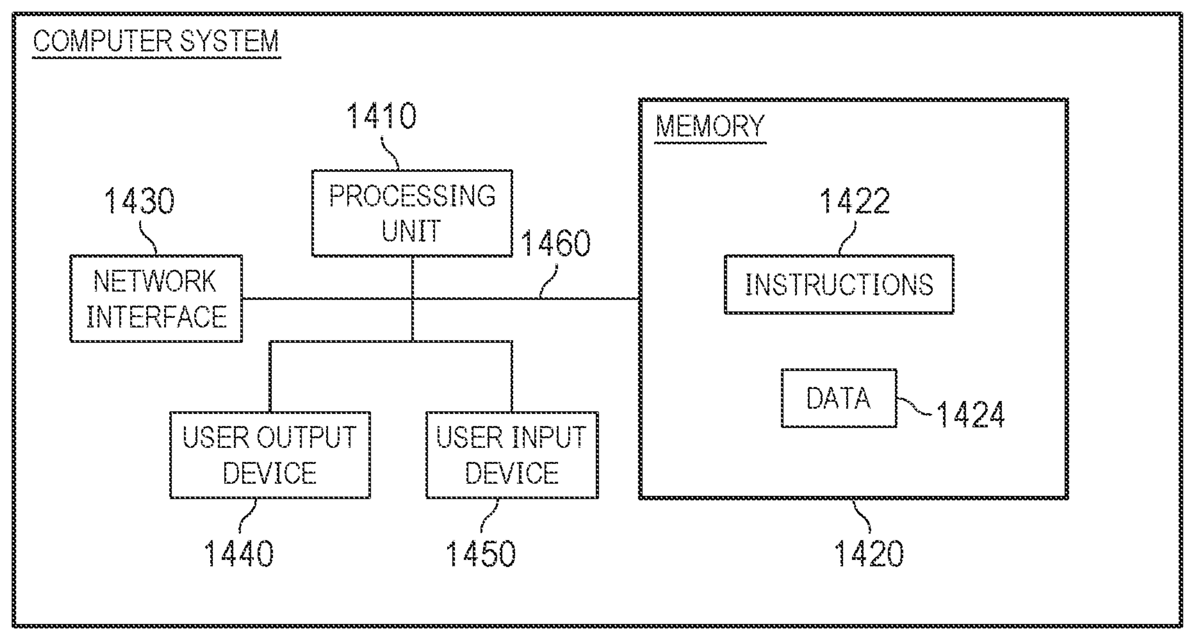

FIG. 14 illustrates selected components of an example computer system 1400 for animal management. System 1400 may, for example, be part of an RF reader system 110. Among other things, system 1400 includes a processing unit 1410 and memory 1420, which are coupled together by a network system 1460.

Processing unit 1410 may, for example, include one or more processors (e.g., microprocessors, microcontrollers, field-programmable gate arrays, or application specific integrated circuits). The processors could, for instance, operate according to reduced instruction set computer (RISC) or complex instruction set computer (CISC) principles. Processing unit 1410 may operate according to instructions stored in memory 1420 and/or encoded on processing unit 1410 itself. In general, processing unit 1410 may include any number of devices that can manipulate information in a logical manner.

Memory 1420 may, for example, include random access memory (RAM), read-only memory (ROM), and/or disc memory. Various items may be stored in different portions of the memory at various times. Memory 1430, in general, may be any combination of devices for storing information.

Memory 1420 includes instructions 1422 and data 1424. Instructions 1422 may include an operating system (e.g., Windows, Linux, or Unix) and one or more applications. In certain implementations, applications could include a tag read controller, for generating tag scans, a tag read processor, for analyzing and deduping tag scans, and a communication analyzer, for writing communication nodes. Data 1424 may include the location data, health assessments, and current operating condition of a water delivery system.

Network interface 1430 may include one or more communication interfaces. A communication interface may, for instance, be a network interface card (whether wireline or wireless) or a modem (whether wireline or wireless). The communication interface may allow data exchange with a data network (e.g., the Internet or an Ethernet) or a phone network (e.g., a cellular network).

System 1400 also includes a user output device 1440 and a user input device 1450. User output device 1440 could, for example, be a display, a speaker, or an indicator (e.g., a light). User input device 1450 could, for example, be a keyboard, a keypad, a touchpad, a stylus, a mouse, or a microphone.

Network system 1460 is responsible for communicating information between processing unit 1410, memory 1420, network interface 1430, user output device 1440, and user input device 1450. Network system 1460 may, for example, include a number of different types of busses (e.g., serial and parallel).

Processing 1410 may implement any of the other procedures discussed herein, to accomplish these operations.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for animal management, and several others have been mentioned or suggested. Moreover, those skilled in the art will readily recognize that a variety of additions, deletions, modifications, and substitutions may be made to these implementations while still achieving animal management. Thus, the scope of the protected subject matter should be judged based on the following claims, which may capture one or more concepts of one or more implementations.

The invention claimed is:

1. An animal management system, the system comprising:

a server system comprising an electronic processor, the server system configured to receive tag scan data from radio frequency (RF) reader systems; and a first radio frequency (RF) reader system adapted to scan for radio frequency identification (RFID) tags in a first area, wherein the first RF reader system generates a tag scan window upon detecting an RFID tag, scans for tags during the tag scan window, and sends data regarding RFID tags detected during the tag scan window to the server system;

wherein the first RF reader system creates a tag scan period for each RFID tag detected during a tag scan window and updates the tag scan periods upon subsequent detections of the corresponding RFID tags during the tag scan window;

wherein the server system determines whether to combine tag scan periods for an RFID tag detected in a tag scan window to analyze an animal's visit to the first area.

2. The animal management system of claim 1, wherein the first RF reader system comprises an antenna, a tag reader, a controller, and a housing, the housing enclosing the antenna, the tag reader, and the controller.

3. The animal management system of claim 2, wherein the housing comprises a slot for receiving the antenna.

4. The animal management system of claim 2, wherein the housing encapsulates the antenna.

5. The animal management system of claim 1, wherein the first RF reader system comprises an antenna that generates a fan beam.

6. The animal management system of claim 5, wherein the fan beam is at least twice as long as it is wide.

7. The animal management system of claim 1, further comprising a camera configured to capture an image of the first area, wherein the first RF reader system is adapted to determine if an animal is present in the first area based on a scan for RFID tags and activate the camera if an animal is present in the first area.

8. An animal management system, the system comprising:

a first radio frequency (RF) reader system adapted to scan for radio frequency identification (RFID) tags in a first area, the first RF reader system generating a first tag scan window upon detecting an RFID tag and scanning for tags during the first tag scan window; and a second radio frequency (RF) reader system adapted to scan for RFID tags in a second area that does not overlap with the first area, the second RF reader system generating a second tag scan window upon detecting an RFID tag and scanning for tags during the second tag scan window;

wherein the first RF reader system creates a tag scan period for each RFID tag detected during the first tag scan window and updates the tag scan periods upon subsequent detections of the corresponding RFID tags during the first tag scan window.

9. The animal management system of claim 8, wherein the first RF reader system is adapted to transmit data regarding RFID tags detected during the first tag scan window and the second tag scan window to a remote host.

10. The animal management system of claim 9, wherein the second RF reader system is configured to communicate with the remote host, and the second RF reader system can send RFID tag data from the second RF reader system to the remote host.

11. The animal management system of claim 8, wherein the first RF reader system comprises an antenna, a tag reader, a controller, and a housing, the housing enclosing the antenna, the tag reader, and the controller.

12. The animal management system of claim 11, wherein the first RF reader system includes a secondary antenna that is external to the housing.

13. The animal management system of claim 8, wherein the first RF reader system comprises a housing that encapsulates an antenna.

14. The animal management system of claim 8, wherein the first RF reader system comprises an antenna that generates a fan beam.

15. The animal management system of claim 14, wherein the fan beam is at least twice as long as it is wide.

16. The animal management system of claim 8, further comprising a camera configured to capture an image of the first area, wherein the first RF reader system is adapted to determine if an animal is present in the first area based on a scan for RFID tags and activate the camera if an animal is present in the first area.

17. The animal management system of claim 10, wherein the RF reader systems send status information to each other, and the first RF reader system can decide whether to cease communicating with the remote host based on the status of the second RF reader system and instruct the second RF reader system to begin communicating with the remote host.

18. The animal management system of claim 17, wherein the first RF reader system evaluates the battery status of the second RF reader system in determining whether to instruct it to begin communicating with the remote host.

19. The animal management system of claim 1, further comprising:

a second radio frequency (RF) reader system adapted to scan for RFID tags in a second area that overlaps with the first area and send data regarding detected RFID tags in the second area to the server system;

wherein the server system is adapted to compare the RFID tags detected by the second RF reader system to those detected by the first RF reader system and dedupe detections of the same RFID tags.

20. The animal management system of claim 1, wherein the server system analyzes consecutive tag scan windows for the first RF reader system to analyze an animal's visit to the first area.

21. The animal management system of claim 20, wherein the server system determines whether to combine tag scan periods for an RFID tag in consecutive tag scan windows for the first RF reader system to analyze an animal's visit to the first area.

22. The animal management system of claim 1, wherein the first RF reader system scans for tags at a first rate when a tag scan window is not active and at a second rate when a tag scan window is active, the second rate being higher than the first rate.

23. The animal management system of claim 22, wherein the first RF reader system returns to scanning for tags at the first rate after a tag scan window ends.

24. The animal management system of claim 8, further comprising a server system adapted to receive data regarding RFID tags detected during the first tag scan window from the first RF reader system and data regarding RFID tags detected during the second tag scan window from the second RF reader system.

25. The animal management system of claim 24, wherein the server system compares RFID tags detected by the second RF reader system to RFID tags detected by the first RF reader system and dedupes detections of the same RFID tag.

26. The animal management system of claim 24, wherein the server system determines whether to combine tag scan periods for an RFID tag detected in the first tag scan window to analyze an animal's visit to the first area.

27. The animal management system of claim 24, wherein the server system analyzes consecutive tag scan windows for the first RF reader system to analyze an animal's visit to the first area.

28. The animal management system of claim 27, wherein the server system determines whether to combine tag scan periods for an RFID tag in consecutive tag scan windows for the first RF reader system to analyze an animal's visit to the first area.

29. The animal management system of claim 8, wherein the first RF reader system scans for tags at a first rate when a tag scan window is not active and at a second rate when a tag scan window is active, the second rate being higher than the first rate.

30. The animal management system of claim 29, wherein the first RF reader system returns to scanning for tags at the first rate after a tag scan window ends.

31. The animal management system of claim 19, wherein:

the second RF reader system generates a second tag scan window upon detecting an RFID tag, scans for tags during the second tag scan window, and sends data regarding RFID tags detected during the second tag scan window to the server system; and the server system determines whether the first tag scan window overlaps with the second tag scan window and dedupes any identical RFID tags between the first tag scan window and the second tag scan window.

32. The animal management system of claim 31, wherein the server system analyzes a detection time of an RFID tag in each tag scan window to dedupe between tag scan windows.

33. An animal management system, the system comprising:

a server system comprising an electronic processor, the server system configured to receive tag scan data from radio frequency (RF) reader systems; and a first radio frequency (RF) reader system adapted to scan for radio frequency identification (RFID) tags in a first area, wherein the first RF reader system generates a tag scan window upon detecting an RFID tag, scans for tags during the tag scan window, and sends data regarding RFID tags detected during the tag scan window to the server system;

wherein the first RF reader system creates a tag scan period for each RFID tag detected during a tag scan window and updates the tag scan periods upon subsequent detections of the corresponding RFID tags during the tag scan window;

wherein the server system analyzes consecutive tag scan windows for the first RF reader system to analyze an animal's visit to the first area;

wherein the server system determines whether to combine tag scan periods for an RFID tag in consecutive tag scan windows for the first RF reader system to analyze an animal's visit to the first area.

34. The animal management system of claim 33, further comprising:

a second radio frequency (RF) reader system adapted to scan for RFID tags in a second area that overlaps with the first area and send data regarding detected RFID tags in the second area to the server system;

wherein the server system is adapted to compare the RFID tags detected by the second RF reader system to those detected by the first RF reader system and dedupe detections of the same RFID tags.

35. The animal management system of claim 34, wherein:

the second RF reader system generates a second tag scan window upon detecting an RFID tag, scans for tags during the second tag scan window, and sends data regarding RFID tags detected during the second tag scan window to the server system; and the server system determines whether the first tag scan window overlaps with the second tag scan window and dedupes any identical RFID tags between the first tag scan window and the second tag scan window.

36. The animal management system of claim 35, wherein the server system analyzes a detection time of an RFID tag in each tag scan window to dedupe between tag scan windows.

37. The animal management system of claim 33, wherein the first RF reader system comprises an antenna that generates a fan beam.

38. The animal management system of claim 37, wherein the fan beam is at least twice as long as it is wide.

39. The animal management system of claim 33, further comprising a camera configured to capture an image of the first area, wherein the first RF reader system is adapted to determine if an animal is present in the first area based on a scan for RFID tags and activate the camera if an animal is present in the first area.

40. An animal management system, the system comprising:

a first radio frequency (RF) reader system adapted to scan for radio frequency identification (RFID) tags in a first area, the first RF reader system generating a first tag scan window upon detecting an RFID tag and scanning for tags during the first tag scan window;

a second radio frequency (RF) reader system adapted to scan for RFID tags in a second area that does not overlap with the first area, the second RF reader system generating a second tag scan window upon detecting an RFID tag and scanning for tags during the second tag scan window; and a server system adapted to receive data regarding RFID tags detected during the first tag scan window from the first RF reader system and data regarding RFID tags detected during the second tag scan window from the second RF reader system;

wherein the first RF reader system creates a tag scan period for each RFID tag detected during the first tag scan window and updates the tag scan periods upon subsequent detections of the corresponding RFID tags during the first tag scan window;

wherein the server system analyzes consecutive tag scan windows for the first RF reader system to analyze an animal's visit to the first area;

wherein the server system determines whether to combine tag scan periods for an RFID tag in consecutive tag scan windows for the first RF reader system to analyze an animal's visit to the first area.

41. The animal management system of claim 40, wherein the first RF reader system is adapted to transmit data regarding RFID tags detected during the first tag scan window and the second tag scan window to a remote host.

42. The animal management system of claim 41, wherein the second RF reader system is configured to communicate with the remote host, and the second RF reader system can send RFID tag data from the second RF reader system to the remote host.

43. The animal management system of claim 42, wherein the RF reader systems send status information to each other, and the first RF reader system can decide whether to cease communicating with the remote host based on the status of the second RF reader system and instruct the second RF reader system to begin communicating with the remote host.

44. The animal management system of claim 43, wherein the first RF reader system evaluates the battery status of the second RF reader system in determining whether to instruct it to begin communicating with the remote host.

45. The animal management system of claim 40, wherein the first RF reader system comprises an antenna that generates a fan beam.

46. The animal management system of claim 45, wherein the fan beam is at least twice as long as it is wide.

47. The animal management system of claim 40, further comprising a camera configured to capture an image of the first area, wherein the first RF reader system is adapted to determine if an animal is present in the first area based on a scan for RFID tags and activate the camera if an animal is present in the first area.

48. The animal management system of claim 40, wherein the server system compares RFID tags detected by the second RF reader system to RFID tags detected by the first RF reader system and dedupes detections of the same RFID tag.

49. An animal management system, the system comprising:

a server system comprising an electronic processor, the server system configured to receive tag scan data from radio frequency (RF) reader systems; and a first radio frequency (RF) reader system adapted to scan for radio frequency identification (RFID) tags in a first area, wherein the first RF reader system generates a tag scan window upon detecting an RFID tag, scans for tags during the tag scan window, and sends data regarding RFID tags detected during the tag scan window to the server system;

wherein the first RF reader system scans for tags at a first rate when a tag scan window is not active and at a second rate when a tag scan window is active, the second rate being higher than the first rate.

50. The animal management system of claim 49, further comprising:

a second radio frequency (RF) reader system adapted to scan for RFID tags in a second area that overlaps with the first area and send data regarding RFID tags detected in the second area to the server system;

wherein the server system is adapted to compare the RFID tags detected by the second RF reader system to those detected by the first RF reader system and dedupe detections of the same RFID tags.

51. The animal management system of claim 50, wherein:

the second RF reader system generates a second tag scan window upon detecting an RFID tag, scans for tags during the second tag scan window, and sends data regarding RFID tags detected during the second tag scan window to the server system; and the server system determines whether the first tag scan window overlaps with the second tag scan window and dedupes any identical RFID tags between the first tag scan window and the second tag scan window.

52. The animal management system of claim 51, wherein the server system analyzes a detection time of an RFID tag in each tag scan window to dedupe between the tag scan windows.

53. The animal management system of claim 49, wherein the first RF reader system creates a tag scan period for each RFID tag detected during the tag scan window and updates the tag scan periods upon subsequent detections of the corresponding RFID tags during the tag scan window.

54. The animal management system of claim 49, wherein the first RF reader system comprises an antenna that generates a fan beam.

55. The animal management system of claim 54, wherein the fan beam is at least twice as long as it is wide.

56. The animal management system of claim 49, further comprising a camera configured to capture an image of the first area, wherein the first RF reader system is adapted to determine if an animal is present in the first area based on a scan for RFID tags and activate the camera if an animal is present in the first area.

57. The animal management system of claim 49, wherein the first RF reader system returns to scanning for tags at the first rate after a tag scan window ends.

58. An animal management system, the system comprising:

a first radio frequency (RF) reader system adapted to scan for radio frequency identification (RFID) tags in a first area, the first RF reader system generating a first tag scan window upon detecting an RFID tag and scanning for tags during the first tag scan window; and a second radio frequency (RF) reader system adapted to scan for RFID tags in a second area that does not overlap with the first area, the second RF reader system generating a second tag scan window upon detecting an RFID tag and scanning for tags during the second tag scan window;

wherein the first RF reader system scans for tags at a first rate when the first tag scan window is not active and at a second rate when the first tag scan window is active, the second rate being higher than the first rate.

59. The animal management system of claim 58, wherein the first RF reader system is adapted to transmit data regarding RFID tags detected during the first tag scan window and the second tag scan window to a remote host.

60. The animal management system of claim 59, wherein the second RF reader system is configured to communicate with the remote host, and the second RF reader system can send RFID tag data from the second RF reader system to the remote host.

61. The animal management system of claim 60, wherein the RF reader systems send status information to each other, and the first RF reader system can decide whether to cease communicating with the remote host based on the status of the second RF reader system and instruct the second RF reader system to begin communicating with the remote host.

62. The animal management system of claim 61, wherein the first RF reader system evaluates a battery status of the second RF reader system in determining whether to instruct it to begin communicating with the remote host.

63. The animal management system of claim 58, wherein the first RF reader system comprises an antenna that generates a fan beam.

64. The animal management system of claim 63, wherein the fan beam is at least twice as long as it is wide.

65. The animal management system of claim 58, further comprising a camera configured to capture an image of the first area, wherein the first RF reader system is adapted to determine if an animal is present in the first area based on a scan for RFID tags and activate the camera if an animal is present in the first area.

66. The animal management system of claim 58, further comprising a server system adapted to receive data regarding RFID tags detected during the first tag scan window from the first RF reader system and data regarding RFID tags detected during the second tag scan window from the second RF reader system.

67. The animal management system of claim 66, wherein the server system compares RFID tags detected by the second RF reader system to RFID tags detected by the first RF reader system and dedupes detections of the same RFID tag.

68. The animal management system of claim 58, wherein the first RF reader system creates a tag scan period for each RFID tag detected during the first tag scan window and updates the tag scan periods upon subsequent detections of the corresponding RFID tags during the first tag scan window.

69. The animal management system of claim 58, wherein the first RF reader system returns to scanning for tags at the first rate after the first tag scan window ends.

* * * * *